(12) United States Patent
Tanaka et al.

(10) Patent No.: US 7,209,654 B2
(45) Date of Patent: Apr. 24, 2007

(54) OPTICAL TRANSMISSION SYSTEM

(75) Inventors: Toshiki Tanaka, Kawasaki (JP); Takao Naito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 09/962,116

(22) Filed: Sep. 26, 2001

(65) Prior Publication Data

US 2002/0131132 A1     Sep. 19, 2002

(30) Foreign Application Priority Data

Mar. 16, 2001  (JP)  ............................. 2001-075721

(51) Int. Cl.
  *H04B 10/08*   (2006.01)
  *H04B 10/12*   (2006.01)
  *H04B 10/00*   (2006.01)
  *H04J 14/02*   (2006.01)

(52) U.S. Cl. ........................... 398/29; 398/81; 398/92; 398/148; 398/158; 398/159

(58) Field of Classification Search ................... 398/29, 398/81, 92, 148, 157, 159, 178, 180; 359/334, 359/337.5, 341.3
See application file for complete search history.

(56) References Cited

U.S. PATENT DOCUMENTS

| | | | |
|---|---|---|---|
| 5,912,754 A * | 6/1999 | Koga et al. .................... | 398/97 |
| 6,188,823 B1 | 2/2001 | Ma | |
| 6,311,002 B1 * | 10/2001 | Evangelides et al. ........ | 385/123 |
| 6,687,433 B2 * | 2/2004 | Okuno et al. ................ | 385/27 |
| 6,697,558 B2 * | 2/2004 | Hansen et al. ............... | 385/123 |
| 6,744,990 B1 * | 6/2004 | Suzuki et al. ................ | 398/147 |
| 6,985,283 B1 * | 1/2006 | Islam et al. .................. | 359/334 |
| 2002/0048439 A1 * | 4/2002 | Tsukitani et al. ............ | 385/123 |

FOREIGN PATENT DOCUMENTS

| | | |
|---|---|---|
| EP | 0 730 354 | 9/1996 |
| GB | 2 268 018 | 12/1993 |

OTHER PUBLICATIONS

Takashina et al., "1T bit/s (100chx10G bit/s) WDM Repeaterless Transmission over 200km with Raman Amplifier", IEEE, Optical Fiber Communication Conference, Mar. 7-10, 2000, vol. 4, pp. 53-56.*

Kawakami et al., "Highly Efficient Distributed Raman Amplification System in a Zero-Dispersion-Flattened transmission line", OAA'99, ThB5-1—ThB5-4, 1999, pp. 110-113.

(Continued)

*Primary Examiner*—Dalzid Singh
(74) *Attorney, Agent, or Firm*—Staas & Halsey LLP

(57) ABSTRACT

A plurality of optical repeaters are provided on a transmission line between an optical transmitting station and an optical receiving station. A combined transmission line section is provided between optical repeaters. The combined transmission line section is composed of the first optical fiber, which is a positive-dispersion fiber, and the second optical fiber, which is a negative-dispersion fiber. Signal light is inputted to the first optical fiber in each combined transmission line section. Each optical repeater inputs pump light to the second optical fiber.

16 Claims, 28 Drawing Sheets

OTHER PUBLICATIONS

Murakami, et al., "Long-Haul 16×10 WDM Transmission Experiment Using Higher Order Fiber Dispersion Management Technique", ECOC'98, Sep. 20-24, 1998, pp. 313-314.

Tsuritani, et al., "1Tbit/s (100×10.7Gbit/s) Transpacific Transmission Over 7,750 km Using Single-Stage 980nm-Pumped C-Band Optical Repeaters Without Forward Error Correction", OECC 2000, Technical Digest, 11A2-3, Jul. 2000, pp. 22-23.

Davidson, et al., "1800 Gb/s Transmission of One Hundred and Eighty 10 Gb/s WDM Channels Over 7,000 km using the Full EDFA C-Band", OFC 2000, PD-25-1-PD25-3, 2000.

Emori et al., "100nm bandwidth flat gain Raman amplifiers pumped and gain-equalized by 12-wavelength-channel WDM high power laser diodes", OFC'99, PD19-1—PD19-3., 1999.

Nissov, et al., <<100 Gb/s(10×10Gb/s) WMD Transmission Over 7200 km Using Distributed Raman Amplifications >>, ECOC'97, 22-25, Conference Publication No. 448, Sep. 1997, pp. 9-12.

\* cited by examiner

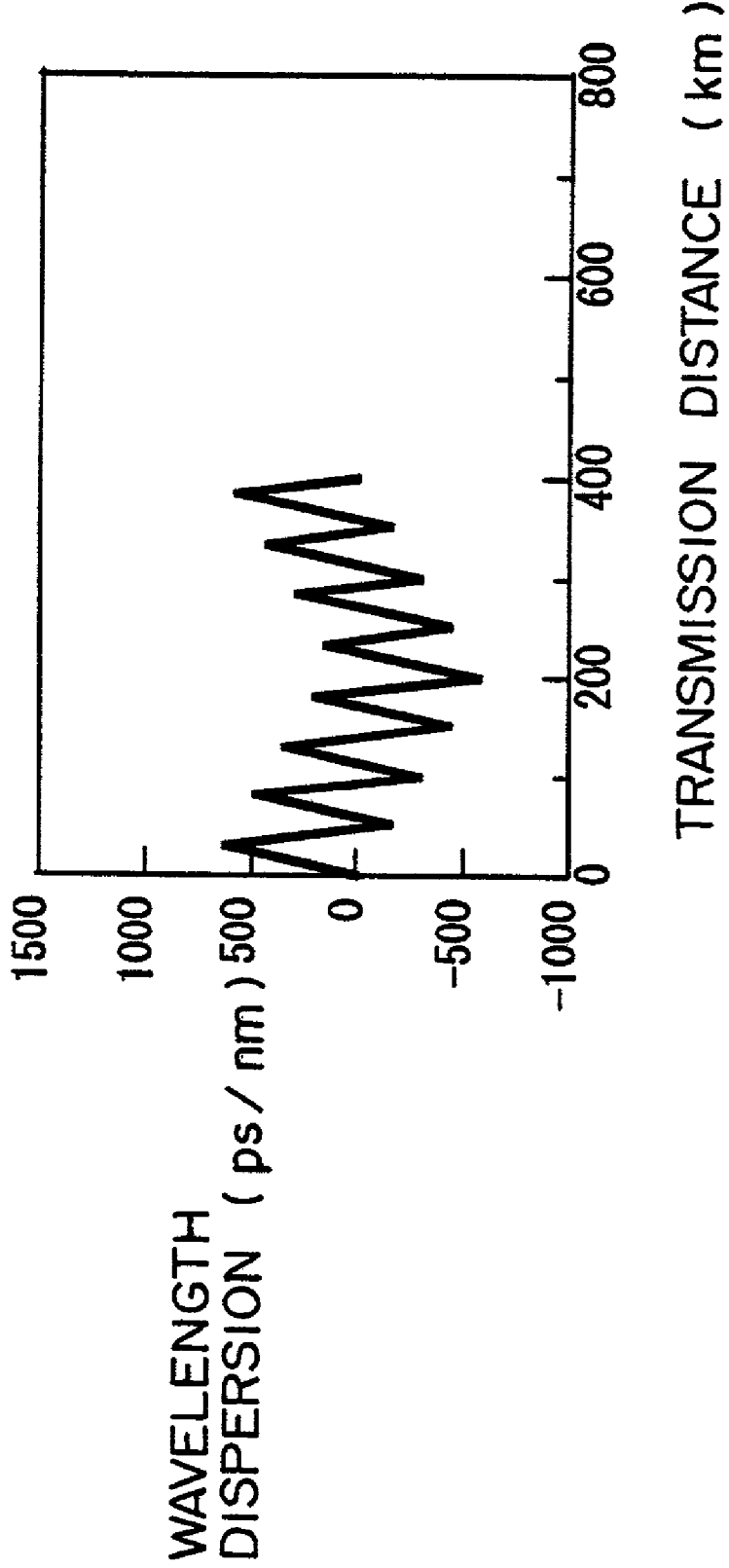
F I G. 7

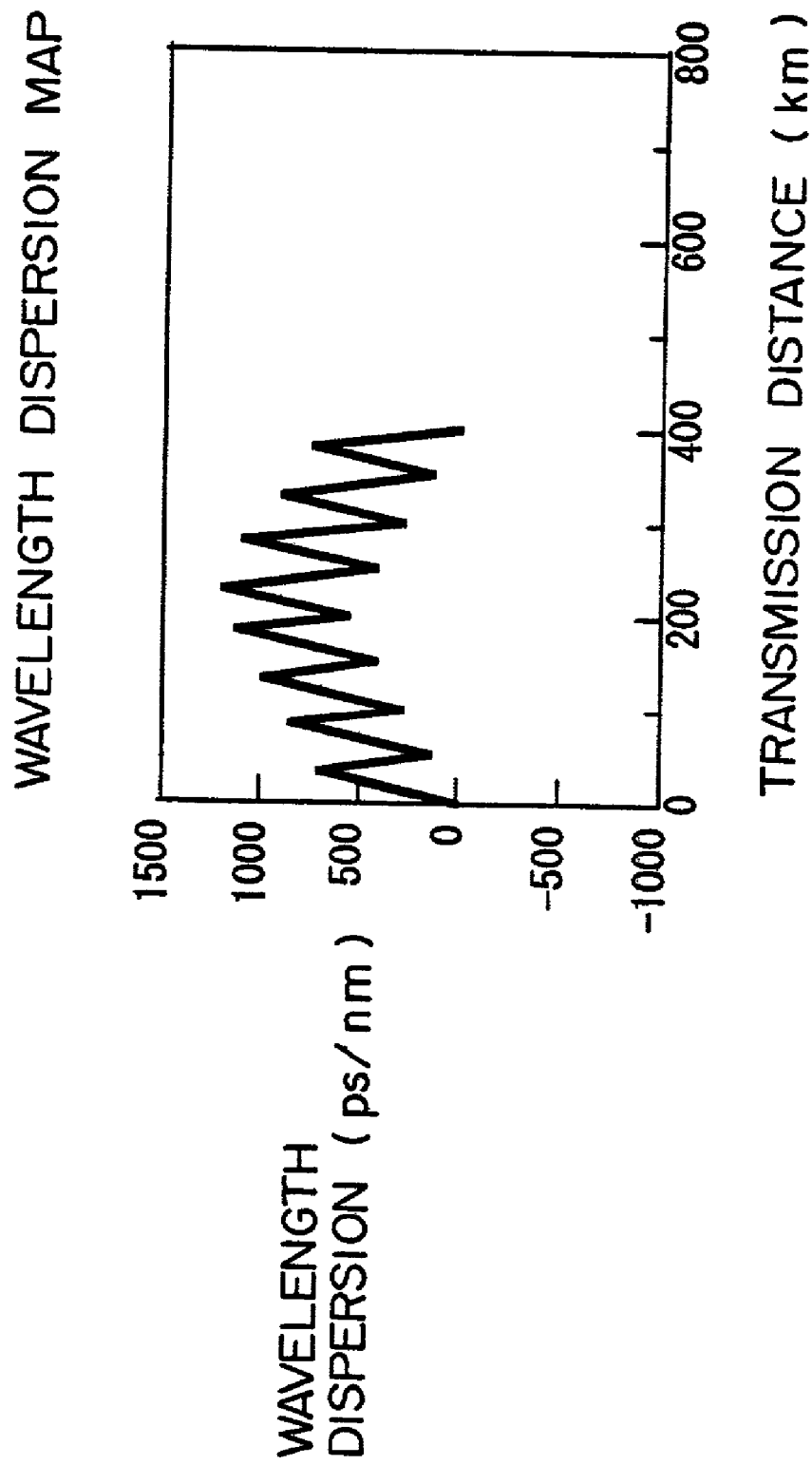
F I G. 10

| PUMP LIGHT WAVELENGTH (nm) | RAMAN GAIN PEAK WAVELENGTH (nm) |
|---|---|
| 1430 | 1526 |
| 1448 | 1546 |
| 1465 | 1566 |
| 1483 | 1587 |
| 1502 | 1608 |
| 1521 | 1630 |

FIG. 27

OPTICAL TRANSMISSION SYSTEM

BACKGROUND OF THE INVENTION

1. Field of the Invention

The present invention relates to an optical transmission system utilizing Raman amplification.

2. Description of the Related Art

Conventionally, in a long-haul optical transmission system, a plurality of repeaters (optical regenerating repeaters) were provided on a transmission line, and a 3R (retiming, reshaping and regenerating) process was performed to electrical signal converted from optical signal in each repeater. Then, the optical signals were generated from the electrical signals and were transmitted to the transmission line again. However, lately, both the performance and cost of an optical amplifier have been improved and reduced, respectively, and an optical transmission system using an optical amplifier as a linear repeater has been commercialized. Thus, by replacing an optical regenerating repeater with an optical amplifier repeater, the number of components of a repeater apparatus is greatly reduced. Therefore, it is anticipated that reliability is improved and cost is greatly reduced.

As one method for implementing a large-capacity optical transmission system, a wavelength-division multiplexing (WDM) optical transmission system has got attention. In a WDM optical transmission system, a plurality of signal light with different wavelengths are multiplexed in one optical transmission line. Therefore, an information amount to be transmitted through each optical fiber is rapidly increased.

As one method for amplifying an optical signal, Raman amplification has got attention. In Raman amplification, since an optical fiber itself, which is a medium for transmitting optical signals, functions as an optical amplifier, a wide wavelength band can be collectively amplified by properly selecting pump light to be supplied to the optical fiber.

By combining these technologies, a plurality of optical signals with different wavelengths can be collectively amplified by using an optical amplifier. Therefore, a large-capacity and long-haul transmission can be implemented with a simple configuration.

FIG. 1 shows the configuration of a general wavelength division multiplexing (WDM) transmission system. Here, the system is assumed in which an optical transmitting station (OS) 100 transmits multi-wavelength light to an optical receiving station (OR) 110 through an optical transmission line (optical fiber). On this optical transmission line, optical amplifiers (optical repeaters) 120 are located at prescribed intervals.

The optical transmitting station 100 comprises a plurality of optical transmitters (E/O) 101 for generating optical signals with different wavelengths, a multiplexer 102 for multiplexing the optical signals generated by the plurality of optical transmitters 101 and a post-amplifier 103 for amplifying the multi-wavelength light outputted from the multiplexer 102 up to a prescribed level and transmitting the light to the optical transmission line. The optical receiving station 110 comprises a pre-amplifier 111 for amplifying the multi-wavelength light transmitted through the optical transmission line to a prescribed level, a demultiplexer 112 for demultiplexing the multi-wavelength light amplified by the pre-amplifier 111 for each wavelength and a plurality of optical receivers (O/E) 113 for converting each optical signal demultiplexed by the demultiplexer 112 into an electrical signal. The multi-wavelength light that is transmitted from the optical transmitting station 100 is transmitted through the optical transmission line while being amplified by the optical amplifier 120 and is received by the optical receiving station 110.

In the optical transmission system described above, conventionally, as the optical amplifier, an erbium-doped fiber amplifier (EDFA) was widely used. However, lately, a configuration in which the erbium-doped fiber amplifier is replaced with a Raman amplifier or a configuration in which both the erbium-doped fiber amplifier and Raman amplifier are used has been commercialized.

In Raman amplification using an optical fiber, the gain is inversely proportional to the mode field diameter (or core diameter) of the optical fiber. Therefore, an optical fiber with a small mode field diameter is suitable for Raman amplification. The relationship between the mode field diameter of an optical fiber and the gain of Raman amplification has been studied, for example, in "Highly Efficient Distributed Raman Amplification System in a Zero-dispersion-flattened Transmission Line", H. Kawakami et al., ThB5, OAA'99 (1999).

In the design of a WDM transmission system, the non-linear effect of an optical transmission line must be taken into consideration. Specifically, the wavelength dispersion of a transmission line must be managed so as to reduce the degradation of a transmission characteristic due to the non-linear effect of an optical transmission line. A variety of studies have been made as to this problem up to now.

For example, in "Long-haul 16×10 WDM Transmission Experiment Using Higher order Fiber Dispersion Management Technique", M. Murakami et al., pp. 313–314, ECOC'98 (1998)(hereinafter called "Reference 1"), an optical transmission line between an optical transmitting station and an optical receiving station comprises a combined transmission line section composed of one set of a positive-dispersion fiber and a negative-dispersion fiber, and a compensation section composed of an optical fiber for compensating for the dispersion of the combined transmission line section. The optical transmission line between the optical transmitting station and the optical receiving station is composed of a plurality of combined transmission line sections, and optical repeaters are installed between each of them. The compensation section compensates for accumulated dispersion in the plurality of combined transmission line sections. As an example, the average zero-dispersion wavelength of the transmission line and the signal light wavelength are approximately 1551 nm and 1544.5–1556.5 nm, respectively. The wavelength dispersion of each of the combined transmission line section and compensation section are approximately −2 ps/nm/km and approximately +20 ps/nm/km, respectively. Since both the group velocity of signal light and natural emission light, and group velocity of a plurality sets of signal light vary depending on this configuration, the cross-operation time of the non-linear effect becomes short. Therefore, the degradation of the transmission characteristic due to four wave mixing (FWM), cross-phase modulation (XPM) and the like is reduced. Since the average zero-dispersion wavelength is within the signal light wavelength range, the degradation of the transmission characteristic due to self-phase modulation (SPM) and wavelength dispersion is also reduced.

In "1 Tbit/s (100×10.7 Gbit/s) Transpacific Transmission over 7,750 km Using Single-stage 980 nm-pumped C-band Optical Repeaters without Forward Error Correction", T. Tsuritani et al., 11A2–3, OECC2000 (2000)(hereinafter called "Reference 2"), a configuration similar to that of the system described in Reference 1 is disclosed. However, in Reference 1, the wavelength dispersion of each combined transmission line section is negative (−2 ps/nm/km), while in Reference 2, the wavelength dispersion of each combined transmission line section is positive (+2 ps/nm/km).

Furthermore, in "1800 Gb/s Transmission of One Hundred and Eighty 10 Gb/s WDM channels over 7,000 km Using the Full EDFA C-band", C. R. Davidson et al., PD25, OFC2000 (2000)(hereinafter called "Reference 3"), a configuration with nearly zero wavelength dispersion of each combined transmission line section is disclosed. In this system, accumulated dispersion in a plurality of combined transmission line sections is compensated for in the optical receiving station.

Although the gain of Raman amplification greatly depends on wavelength, the gain of Raman amplification can be flattened by using a plurality of pump lights with different wavelengths. For example, in "100 nm Bandwidth Flat Gain Raman Amplifiers Pumped and Gain-equalized by 12 Wavelength-channel WDM High Power Laser Diodes", Y. Emori et al., OFC'99, PD19 (1999), a Raman amplifier which can obtain approximately 100 nm gain band by multiplexing a plurality sets of pump light is disclosed.

In "100 Gb/s (10×10 Gb/s) WDM Transmission over 7,200 km Using Distributed Raman Amplification", M. Nissov et al., ECOC'97 (1997), a technology for transmitting 100 Gb/s signals over 7,200 km by performing distributed Raman amplification using a dispersion shift fiber is disclosed.

Although as described above, a method for managing the wavelength dispersion of a transmission line in order to reduce the influence of the non-linear effect is known, the conventional method has the following problems.

In the systems described in References 1 and 2, accumulated dispersion due to a plurality of combined transmission line sections is compensated for by a compensation section provided after the plurality of combined transmission line sections. For example, if as in the system described in Reference 1, since the wavelength dispersion of each combined transmission line section is negative, an optical fiber composing the compensation section must be a positive-dispersion fiber. However, since usually a positive-dispersion fiber has a large mode field diameter, Raman gain cannot be efficiently obtained. In other words, obtaining a prescribed gain using a positive-dispersion fiber requires extremely large pump power, and the extremely large pump power badly affects the reliability of an pump light source.

To solve this problem, there is a method of providing a short fiber for Raman amplification with an extremely small mode field diameter after the compensation section and compensating for the loss of the compensation section using the fiber for Raman amplification. However, if an optical fiber with an extremely small mode field diameter is used, the non-linear effect becomes large and the transmission characteristic is degraded accordingly. In addition, since a distributed Raman amplifier and a centralized Raman amplifier coexist in a transmission system, the configuration becomes complex and the transmission wave distortion due to the non-linear effect of the entire transmission system increases.

In the system described in Reference 3, since the wavelength dispersion of each combined transmission line section is nearly zero, waveform degradation due to self-phase modulation is reduced. However, since bit arrangement between wavelengths becomes the same in the same position of each combined transmission line section, waveform degradation due to cross-phase modulation becomes a problem.

As described above, in Raman amplification, Raman gain can be flattened over a fairly wide band by multiplexing a plurality sets of pump light. However, to reduce the size of a repeater as much as possible or to reduce power consumption or heat generation as much as possible, the number of pump light sources provided in each repeater must be restricted. For this reason, if the number of channels for transmitting signals is increased, gain deviation increases and transmission characteristic degrades accordingly.

SUMMARY OF THE INVENTION

It is an object of the present invention to solve the problems described above, that is, to provide an optical transmission system with a good transmission characteristic. In particular, it is an object of the present invention to reduce transmission waveform distortion due to a non-linear effect in an optical transmission system utilizing Raman amplification.

The optical transmission system of the present invention is configured so that optical repeaters are provided on a transmission line for transmitting signal light. The optical transmission system comprises a plurality of combined transmission line sections each composed of a first optical fiber with positive dispersion and a second optical fiber with negative dispersion which is provided after the first optical fiber, and a plurality of optical repeaters each of which is provided between the combined transmission line sections and inputs pump light to the second optical fiber of a corresponding combined transmission line section. The plurality of combined transmission line sections include a combined transmission line section with positive accumulated wavelength dispersion and a combined transmission line section with negative accumulated wavelength dispersion, and the transmission line is composed of the combined transmission line section with positive accumulated wavelength dispersion and the combined transmission line section with negative accumulated wavelength dispersion.

In the configuration described above, since the wavelength dispersion of each combined transmission line section is positive or negative and is not zero, there is little degradation due to cross-phase modulation of a transmission waveform. By properly locating a combined transmission line section with positive accumulated wavelength dispersion and a combined transmission line section with negative accumulated wavelength dispersion, the accumulated wavelength dispersion of the entire transmission line can be made substantially zero. Furthermore, pump light for Raman amplification is inputted to the second optical fiber with negative dispersion. Here, an optical fiber with negative dispersion usually has a small mode field diameter and high Raman gain efficiency, compared with an optical fiber with positive dispersion. Therefore, no special fiber (centralized Raman amplifier) is needed to obtain a desired gain.

In the system described above, the transmission line can also be constituted by repeating a basic pattern transmission line section composed of one or more combined transmission line sections with positive accumulated wavelength dispersion and one or more combined transmission line sections with negative accumulated wavelength dispersion. In this configuration, since the same configuration is repeated, the maintenance of a transmission line becomes easy.

Furthermore, in the system described above, a plurality of optical repeaters can include a first optical repeater for supplying a plurality sets of pump light with first wavelengths to a corresponding combined transmission line section and a second optical repeater for supplying pump light with second wavelengths to a corresponding combined transmission line. In this configuration, a plurality of wavelengths for pump light required to obtain Raman gain with little deviation can properly distributed among a plurality of optical repeaters. Therefore, even if a transmission system with little gain deviation and a wide signal light wavelength band is implemented, the number of pump light sources provided in each optical repeater can be reduced.

BRIEF DESCRIPTION OF THE DRAWINGS

FIG. 7 and FIG. 8 are wavelength dispersion maps for showing the wavelength dispersion of signal light in the transmission system shown in FIG. 6;

FIG. 10 is a wavelength dispersion map for showing the wavelength dispersion of signal light in the transmission system shown in FIG. 9;

FIG. 27 shows the relationship between pump light wavelength and the peak wavelength of Raman gain;

DESCRIPTION OF THE PREFERRED EMBODIMENTS

The embodiments of the present invention are described below with reference to the drawings.

Figure 1:
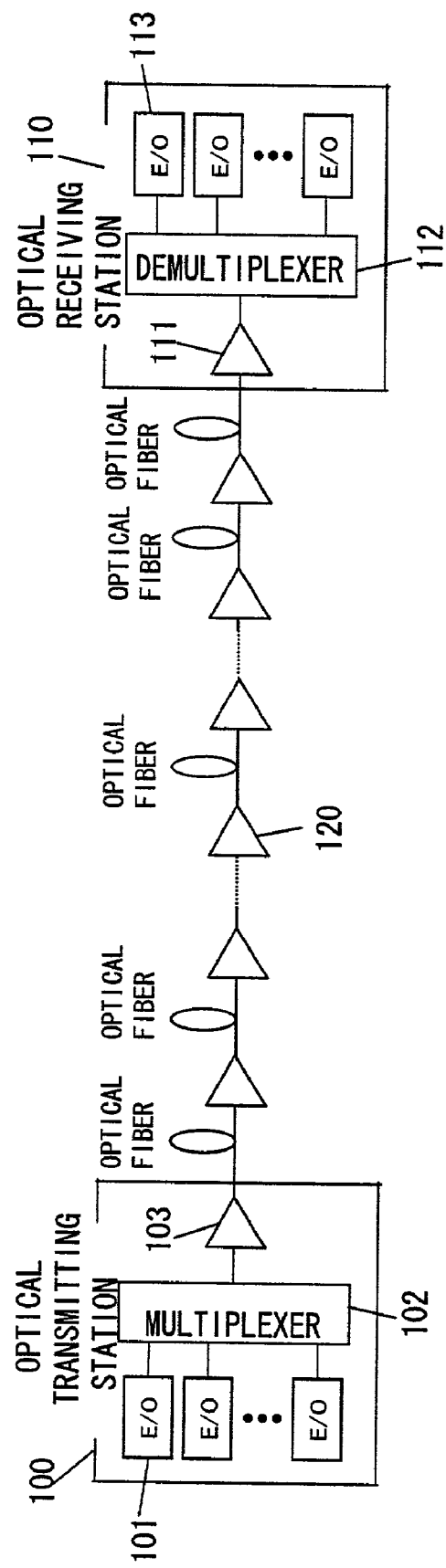
FIG. 1 shows the configuration of a general WDM transmission system.
Figure 2:
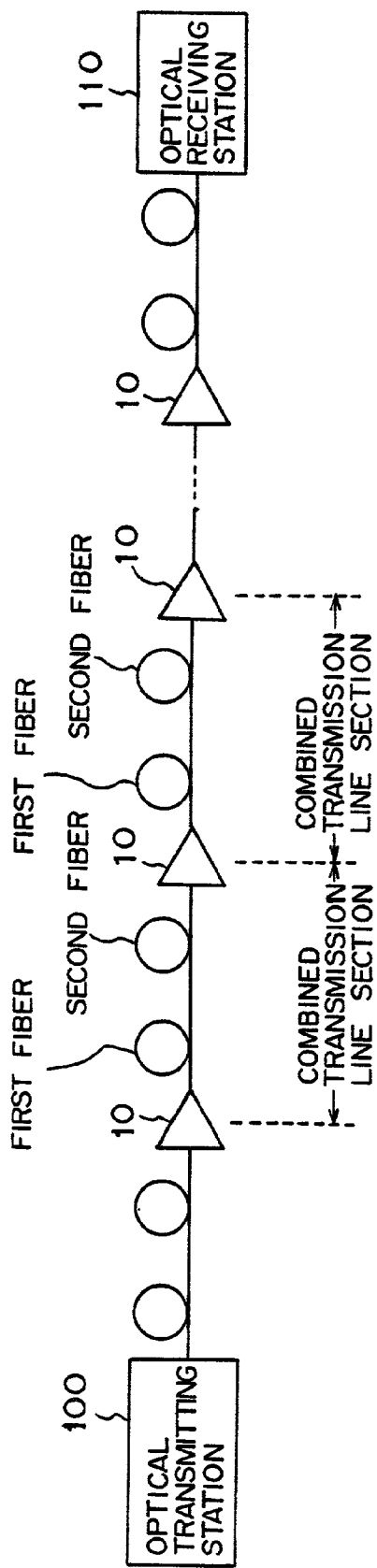
FIG. 2 shows the configuration of the optical transmission system in an embodiment of the present invention.

FIG. 2 shows the configuration of the optical transmission system in an embodiment of the present invention. The optical transmitting station 100 and optical receiving station 110 shown in FIG. 2 are basically the same as those shown in FIG. 1.

In a transmission line between the optical transmitting station 100 and optical receiving station 110, a plurality of optical repeaters 10 are provided. The plurality of optical repeaters 10 are basically located at equal intervals. Each optical repeater 10 has a function to generate pump light for Raman amplification utilizing the vibration of a molecule composing an optical fiber, which is a medium for transmitting signal light, and to supply the pump light to the transmission line.

Each of optical transmission lines between the optical transmitting station 100 and an optical repeater 10, between adjacent optical repeaters 10, and between an optical repeater 10 and the optical receiving station 110 is composed of a first optical fiber and a second optical fiber. The first optical fiber is a positive-dispersion fiber and the second optical fiber is a negative-dispersion fiber. In the following description, a section composed of the first and second optical fibers is called a "combined transmission line section".

In this way, the optical transmission line of the optical transmission system in this embodiment is composed of a plurality of combined transmission line sections.

Figure 3:
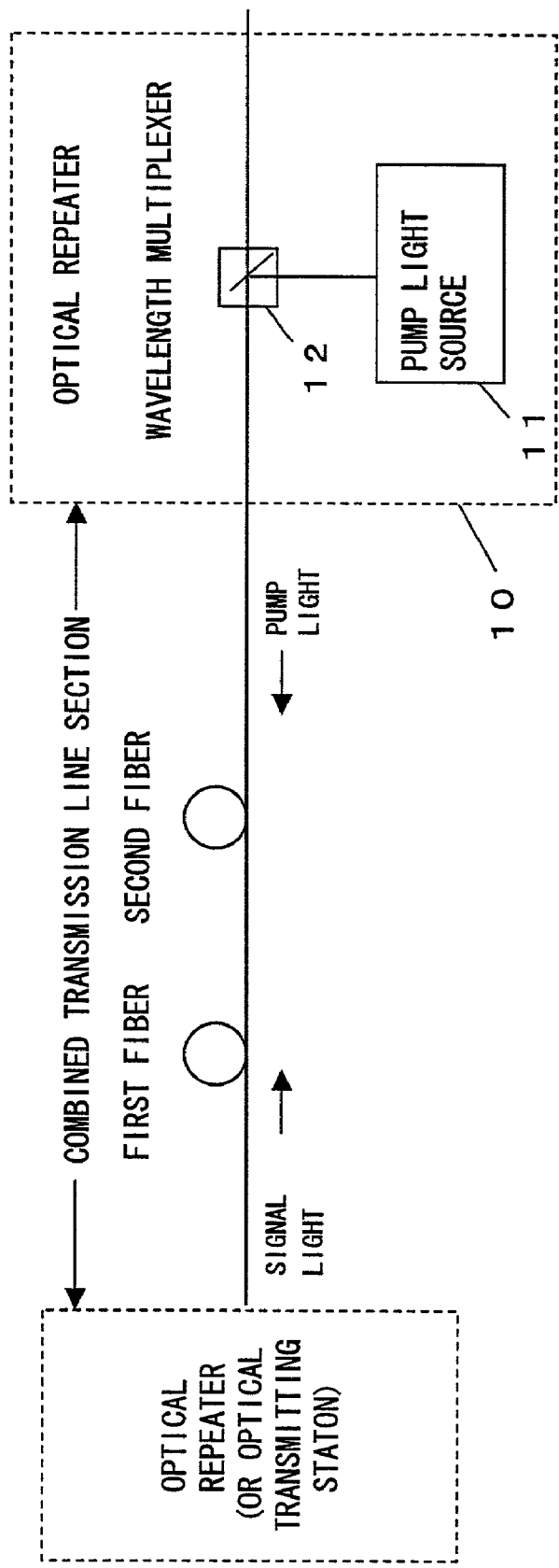
FIG. 3 shows an example of a repeater and a combined transmission line section.

FIG. 3 shows an optical repeater and corresponding combined transmission section. The combined transmission line section comprises the first optical fiber and the second optical fiber. The first optical fiber has positive wavelength dispersion (preferably, and positive dispersion slope) against signal light wavelength, and the second optical fiber has negative wavelength dispersion (preferably, and negative dispersion slope) against signal light wave length. Here, an optical fiber with positive wavelength dispersion usually has a fairly large mode field diameter and a small non-linear effect. On the other hand, an optical fiber with negative wavelength dispersion usually has a fairly small mode field diameter and high Raman amplification efficiency.

In each combined transmission line section, the first and second optical fibers are located in the upper and lower streams, respectively. In other words, signal light going from the transmitting station to the receiving station is first transmitted through the first optical fiber and then is transmitted through the second optical fiber.

The optical repeater 10 comprises an pump light source 11 for generating pump light for Raman amplification and a wavelength multiplexer 12 for guiding the pump light generated by the pump light source 11 to the optical transmission line. The pump light generated by the pump light source 11 is guided to the combined transmission line section so as to be transmitted in the opposite direction of signal light. Specifically, in the combined transmission line section, the pump light generated by the pump light source 11 is first inputted to the second optical fiber and then is inputted to the first optical fiber after passing through the second optical fiber. The pump light source 11 can generate pump light with a specific wavelength or can generate a plurality sets of pump light with different wavelengths. If a plurality sets of pump light are generated, they may be multiplexed before guiding to the optical transmission line.

The accumulated dispersion (sum of wavelength dispersion by the first optical fiber and wavelength dispersion by the second optical fiber) of the combined transmission line section can be set to a desired value. This accumulated dispersion can be adjusted by modifying the ratio in length between the first and second optical fibers or by modifying the dispersion characteristics of the first and/or second optical fibers. For example, it is assumed that a combined transmission line section is 50 km long, the respective wavelength dispersion of the first and second optical fibers are +20.6 ps/nm/km and −44.9 ps/nm/km, respectively. In this case, to make the average wavelength dispersion of the combined transmission line section +2.7 ps/nm/km, the respective lengths of the first and second optical fibers should be modified to 36.36 km and 13.65 km, respectively. To make the average wavelength dispersion −2.7 ps/nm/km, the respective lengths of the first and second optical fibers should be modified to 32.2 km and 17.8 km, respectively.

Figure 4:
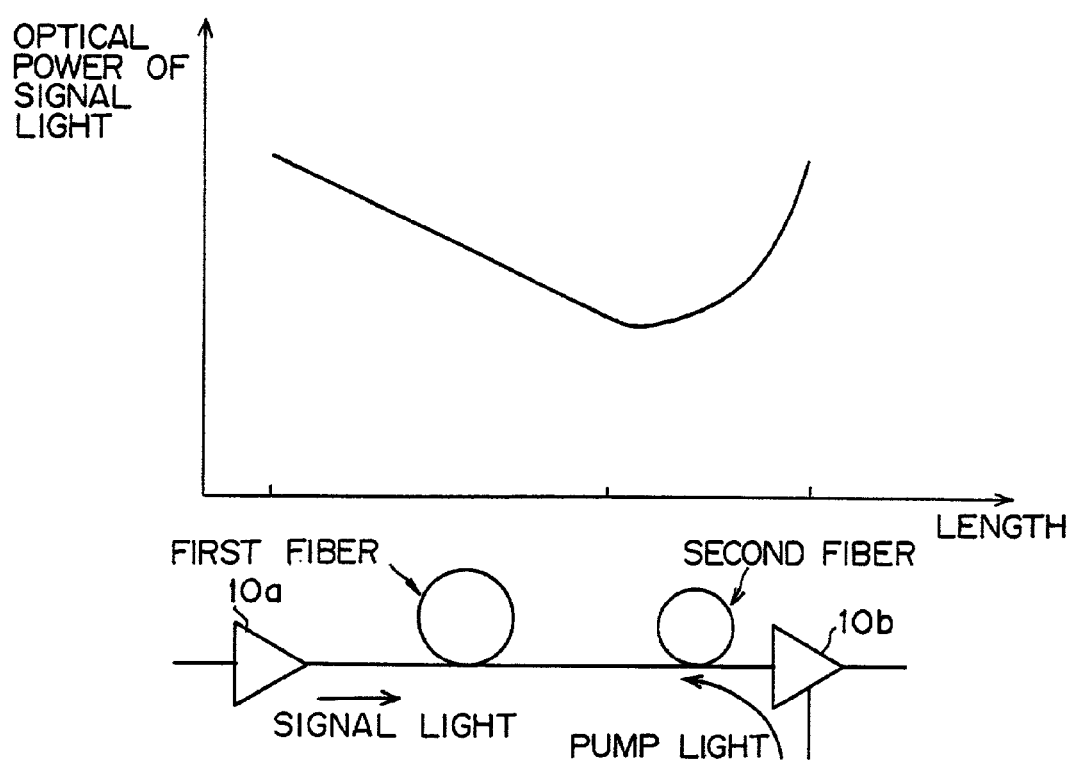
FIG. 4 shows the optical power of signal light in the combined transmission line section.

FIG. 4 shows the optical power of signal light in a combined transmission line section. Here, the optical power in the combined transmission line section for transmitting signal light from an optical repeater 10a to an optical repeater 10b is shown. While being transmitted through the first optical fiber, the optical power of signal light outputted from the optical repeater 10a is gradually attenuated. However, in the second optical fiber, since the optical power of pump light increases as the optical repeater 10b comes near, the signal light is amplified by the pump light. In this case, the optical power of the pump light generated in the optical repeater 10b is adjusted so that the optical power of the signal light output from the optical repeater 10b is a prescribed level.

In this way, in the optical transmission system of this embodiment, since pump light is inputted to the second optical fiber with a fairly small mode field diameter in each combined transmission line section, Raman amplification efficiency is high. The higher the optical power of signal light, the larger the non-linear effect of a transmission line. However, in the system of this preferred embodiment, since the first optical fiber with a fairly large mode field diameter is provided in a section with the high optical power of signal light (that is, section located immediately after the signal light is outputted from the optical repeater), the non-linear effect does not become so large. As a result, the optical signal-to-noise ratio (OSNR) of signal light can be improved and waveform distortion due to the non-linear effect of an optical transmission line can be suppressed.

Figure 5:
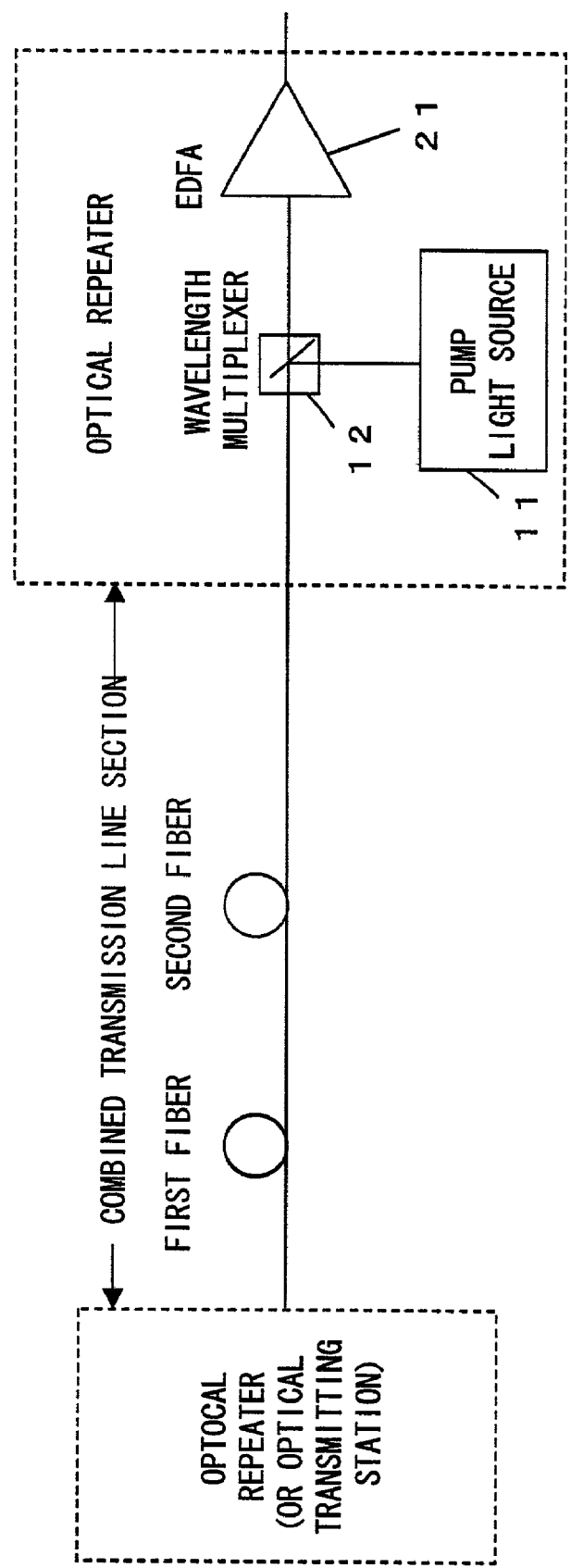
FIG. 5 shows another example of a repeater and a combined transmission line section.

FIG. 5 shows another example of an optical repeater and a combined transmission line section. In the transmission system shown in FIG. 5, a Raman amplifier and another type of optical amplifier are used together. In this example, as another type of optical amplifier, a rare earth-doped fiber amplifier, for example, an erbium-doped fiber amplifier (EDFA) 21 is used. The EDFA 21 can be provided to all or a part of the optical repeaters.

Figure 6:
FIG. 6 shows a system configuration of the optical transmission system of an embodiment.

FIG. 6 shows a configuration of the optical transmission system of the embodiment. In this configuration, as described above, a transmission line between the optical transmitting station 100 and optical receiving station 110 is composed of a plurality of combined transmission line sections. In FIG. 6, a symbol of "−" represents a combined transmission line section with negative accumulated dispersion or negative average dispersion, and a symbol of "+" represents a combined transmission line section with positive accumulated dispersion or positive average dispersion. In the following description, a combined transmission line section with negative accumulated dispersion is called "combined transmission line sections (−D)", and a combined transmission line section with positive accumulated dispersion is called "combined transmission line sections (+D)".

In the system shown in FIG. 6, a combined transmission line section (−D) is located in each of the first four sections started from the optical transmitting station 100 and then a combined transmission line section (+D) is located in each of the subsequent four sections. In the case of a long-haul transmission, this location pattern is repeated.

FIG. 7 is a wavelength dispersion map showing the wavelength dispersion of signal light in the transmission system shown in FIG. 6. In this example, the transmission system is assumed to be designed based on the following parameters.

Length of a combined transmission line section: 50 km
Wavelength dispersion of the first optical fiber: +20.6 ps/nm/km
Wavelength dispersion of the second optical fiber: −44.9 ps/nm/km
Average wavelength dispersion of a combined transmission line section (+D): +2.7 ps/nm/km
   Length of the first optical fiber in this case: 36.36 km
   Length of the second optical fiber in this case: 13.65 km
Average wavelength dispersion of a combined transmission line section (−D): −2.7 ps/nm/km
   Length of the first optical fiber in this case: 32.2 km
   Length of the second optical fiber in this case: 17.8 km In the transmission system described above, signal light from the optical transmitting station 100 is first inputted to the combined transmission line section (−D). Specifically, this signal light is first inputted to the first optical fiber of the combined transmission line section (−D). The first optical fiber is a positive-dispersion fiber. Therefore, as shown in FIG. 7, the wavelength dispersion of the signal light continues to increase. Then, the signal light is transmitted through the second optical fiber. The second optical fiber is a negative-dispersion fiber. Therefore, the wavelength dispersion continues to decrease. Since the average wavelength dispersion (or accumulated wavelength dispersion) of this combined transmission line section is negative, the accumulated wavelength dispersion at the output terminal of this combined transmission line section becomes negative. In this embodiment, the accumulated wavelength dispersion is approximately −135 ps/nm (=−2.7 ps/nm/km×50 km).

Then, this signal light is further transmitted through three sets of combined transmission line section (−D). Therefore, the accumulated wavelength dispersion after the signal light is transmitted through the four sets of combined transmission line sections (−D) becomes approximately −540 ps/nm (=−135 ps/nm×4).

Then, this signal light is transmitted though four consecutive sets of combined transmission line sections (+D). Here, the average wavelength dispersion of each combined transmission line section (+D) is +2.7 ps/nm/km, and the accumulated wavelength dispersion becomes approximately +135 ps/nm (=+2.7 ps/nm/km×50 km). Therefore, the accumulated wavelength dispersion of the four sets of combined transmission line sections (+D) becomes approximately +540 ps/nm. As a result, the accumulated wavelength dispersion after the signal light is transmitted through both four sets of combined transmission line sections (−D) and four sets of combined transmission line sections (+D) becomes nearly zero.

In this way, in the transmission system shown in FIG. 6, the wavelength dispersion of signal light is compensated for in units of eight sets of combined transmission line sections.

Figure 8:
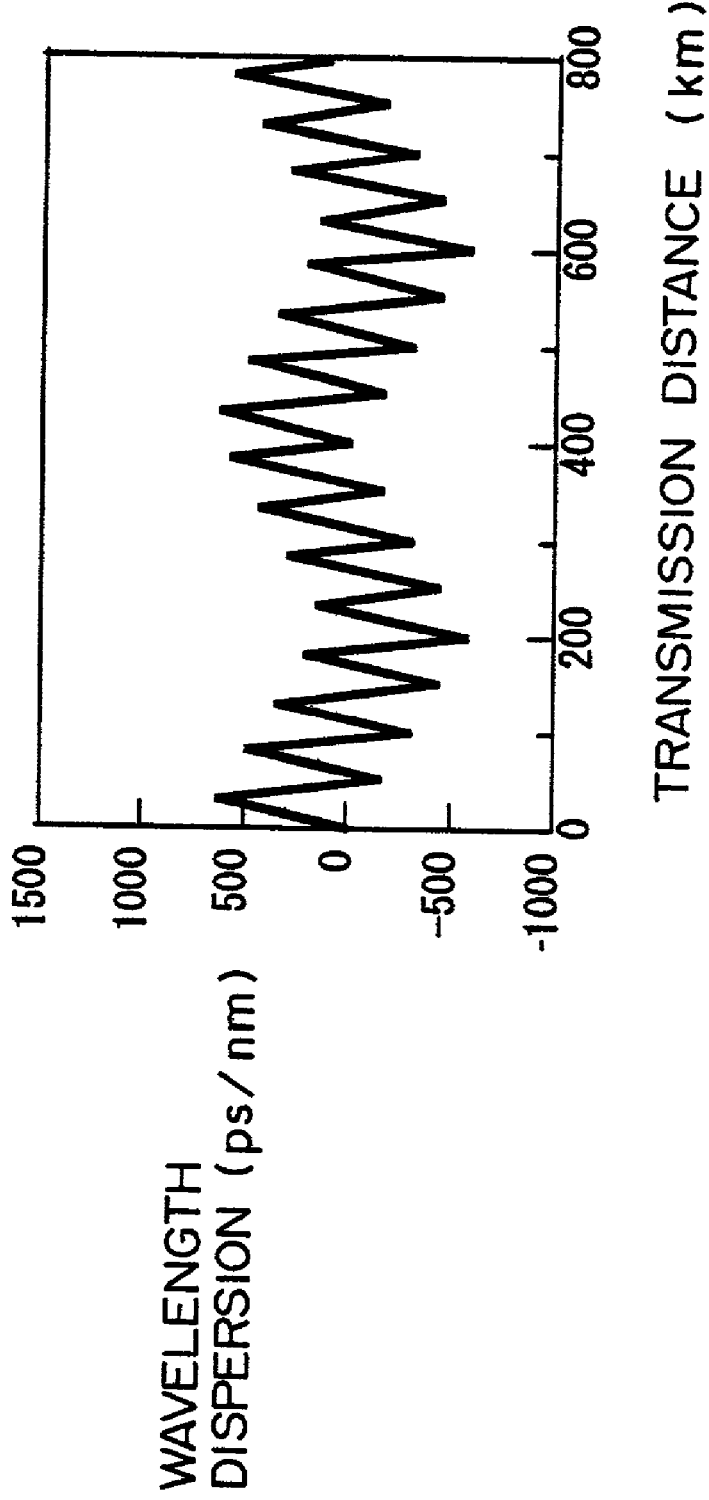

In other words, in a long-haul transmission system, a location pattern is repeated in units of these eight sets of combined transmission line sections. FIG. 8 shows a wavelength dispersion map obtained in the case of a long-haul transmission.

Next, the effects of this embodiment are described, compared with the prior art. In the following description, a transmission system in which a transmission line is composed of eight sections is assumed and the non-linear effect is compared.

The system of this embodiment assumes the configuration shown in FIGS. 6 and 7. Specifically, it is assumed that a transmission line is composed of four sets of combined transmission line sections (−D) and four sets of combined transmission line sections (+D). The conventional system is assumed to be configured as described in Reference 1. Specifically, in the conventional system, a transmission line is composed of seven sets of combined transmission line sections and a compensation section for compensating for the dispersion of the combined transmission line sections. The conventional system further comprises a fiber for centralized Raman amplification for compensating for loss in the compensation section, after the compensation section. The transmission parameters are assumed as follows.

Length of a combined transmission line section: 50 km
   Wavelength dispersion of the first optical fiber: +20.6 ps/nm/km
   Non-linear effective cross-section area of the first optical fiber (at signal light wavelength) 110 $\mu m^2$
   Transmission loss of the first optical fiber (at signal light wavelength): 0.17 dB/km
   Non-linear refractive index coefficient of the first optical fiber: $2.8 \times 10^{20}$ $m^2/W$
   Raman gain coefficient of the first optical fiber: $1.7 \times 10^{14}$ m/W
   Wavelength dispersion of the second optical fiber: −44.9 ps/nm/km
   Non-linear effective cross-section area of the second optical fiber (at signal light wavelength) 18 $\mu m^2$
   Transmission loss of the second optical fiber (at signal light wavelength): 0.27 dB/km
   Non-linear refractive index coefficient of the second optical fiber: $4 \times 10^{20}$ $m^2/W$
   Raman gain coefficient of the second optical fiber: $3.4 \times 10^{14}$ m/W Average wavelength dispersion of a combined transmission line section (+D): +2.7 ps/nm/km
   Length of the first optical fiber in this case: 36.36 km
   Length of the second optical fiber in this case: 13.65 km Average wavelength dispersion of a combined transmission line section (−D): −2.7 ps/nm/km
   Length of the first optical fiber in this case: 32.2 km
   Length of the second optical fiber in this case: 17.8 km In the system of Reference 1, it is assumed that the average wavelength dispersion of each combined transmission line section is −2.0 ps/nm/km, the average wavelength dispersion of the compensation section is +20 ps/nm/km, the length of the fiber for centralized Raman amplification is 8 km, and the non-linear effective cross-section area (at signal light wavelength) of the fiber for centralized Raman amplification is 9.5 $m^2$.

Since in the non-linear effect of an optical fiber, optical Kerr effect is dominant, the influence of the non-linear effect can be evaluated by comparing phase-shift amounts due to self-phase modulation. If simulation is conducted on that assumption, it is anticipated that the non-linear effect of the configuration of Reference 1 will be stronger by approximately 10 percent than that in the configuration of this embodiment. Therefore, it can be expected that in the configuration of this embodiment, the influence of the non-linear effect is suppressed and the transmission characteristic is improved accordingly.

Figure 9:
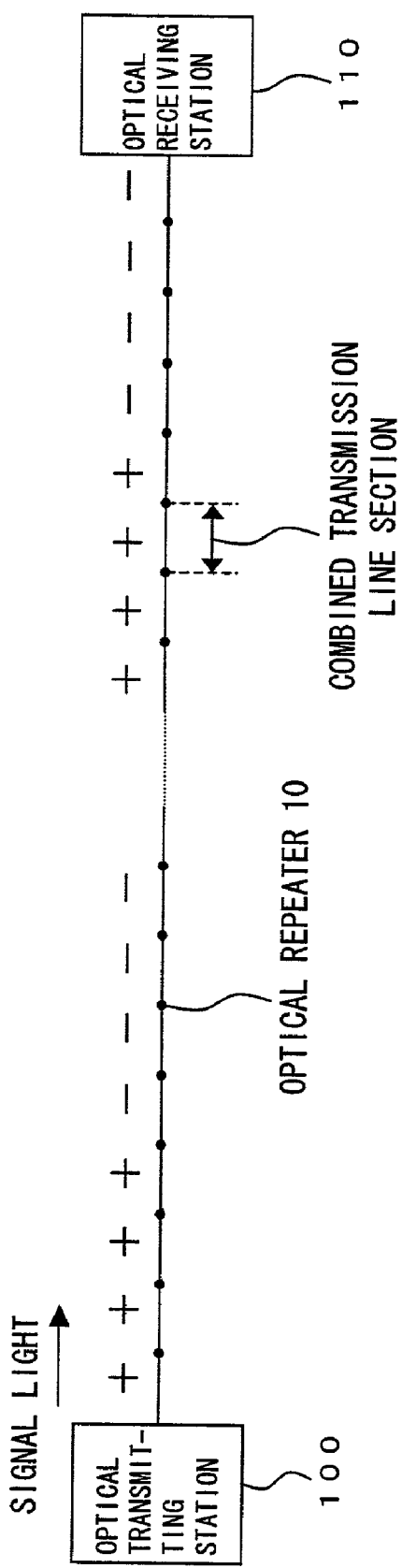
FIG. 9 shows a configuration of the optical transmission system of another embodiment.

FIG. 9 shows a configuration of the optical transmission system of another embodiment. In this system, a combined transmission line section (+D) is located in each of the first four sections started from the optical transmitting station 100, and a combined transmission line section (−D) is located in each of the subsequent four sections. In the case of a long-haul transmission, this location pattern is repeated.

FIG. 10 is a wavelength dispersion map showing the wavelength dispersion of signal light in the transmission system shown in FIG. 9. The parameters of the transmission system are the same as those described with reference to FIG. 6.

In the system described above, signal light transmitted from the optical transmitting station 100 is first inputted to a combined transmission line section (+D). The accumulated wavelength dispersion at the output terminal of this combined transmission line section (+D) becomes approximately +135 ps/nm (=+2.7 ps/nm/km×50 km). Therefore, the accumulated wavelength dispersion after the signal light is transmitted through four sets of combined transmission line sections (+D) becomes +540 ps/nm (=+135 ps/nm×4).

Then, this signal light is transmitted through four consecutive sets of combined transmission line sections (−D). The accumulated wavelength dispersion in each combined transmission line section (−D) is approximately −135 ps/nm, and the accumulated wavelength dispersion after transmission through these four sets of combined transmission line sections (−D) becomes approximately −540 ps/nm. Therefore, the accumulated wavelength dispersion after the signal light is transmitted through four sets of combined transmission line sections (+D) and four sets of combined transmission line sections (−D) becomes nearly zero.

In this way, in the transmission system shown in FIG. 9, the wavelength dispersion is compensated for in units of eight sets of combined transmission line sections as in the system shown in FIG. 6.

Figure 11:
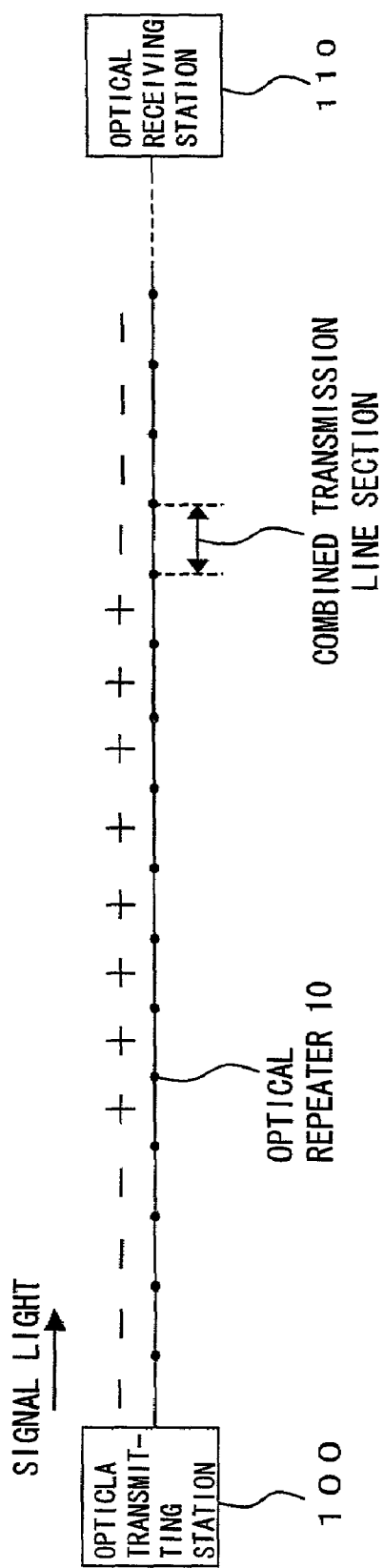
FIG. 11 shows a configuration of the optical transmission system of further embodiment.

FIG. 11 shows an optical transmission system of still another embodiment. This system can be implemented by combining the location pattern shown in FIG. 6 and the location pattern shown in FIG. 9. Specifically, in this system, a combined transmission line section (−D) is located in each of the first four sections started from the optical transmitting station 100, a combined transmission line section (+D) is located in each of the subsequent eight sections and a combined transmission line section (−D) is further located in each of the subsequent four sections. In the case of long-haul transmission, this location pattern is repeated.

Figure 12:
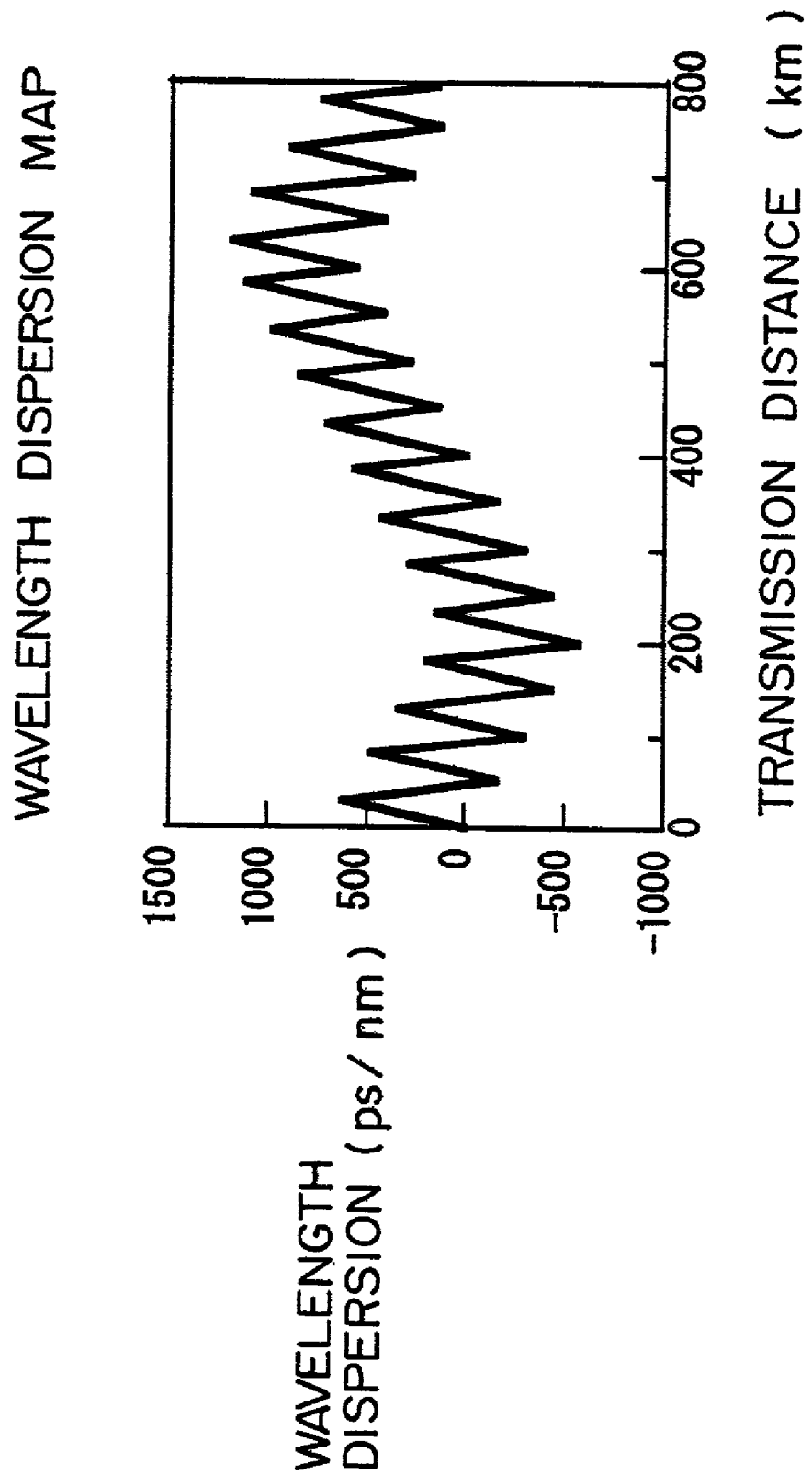
FIG. 12 is a wavelength dispersion map for showing the wavelength dispersion of signal light in the transmission system shown in FIG. 11.

FIG. 12 is a wavelength dispersion map showing the wavelength dispersion in the transmission system shown in FIG. 11. As shown in FIG. 12, the wavelength dispersion of signal light is compensated for in units of 16 sets of combined transmission line sections.

Although in the embodiments described above, the wavelength dispersion of signal light is compensated for in units of 8 or 16 sets of combined transmission line sections (in a basic pattern transmission line), the present invention is not limited to these. However, if a section for compensating for the wavelength dispersion of signal light is too short, waveform distortion due to cross-phase modulation becomes a problem. If a section for compensating for the wavelength dispersion of signal light is too long, since the peak value of the accumulated wavelength dispersion becomes large, waveform distortion can occur. Taking these points into consideration, it is preferable to compensate for the wavelength dispersion of signal light, in units of 4 to 40 sets of combined transmission line sections.

Next, the present invention is applied to a transmission system in which up-stream and down-stream lines are provided between optical terminal stations. In this case, it is assumed that a plurality of optical repeaters are provided on an optical transmission line. It is also assumed that an optical terminal station and an optical repeater, and between optical repeaters are connected by the combined transmission line section.

Figure 13:
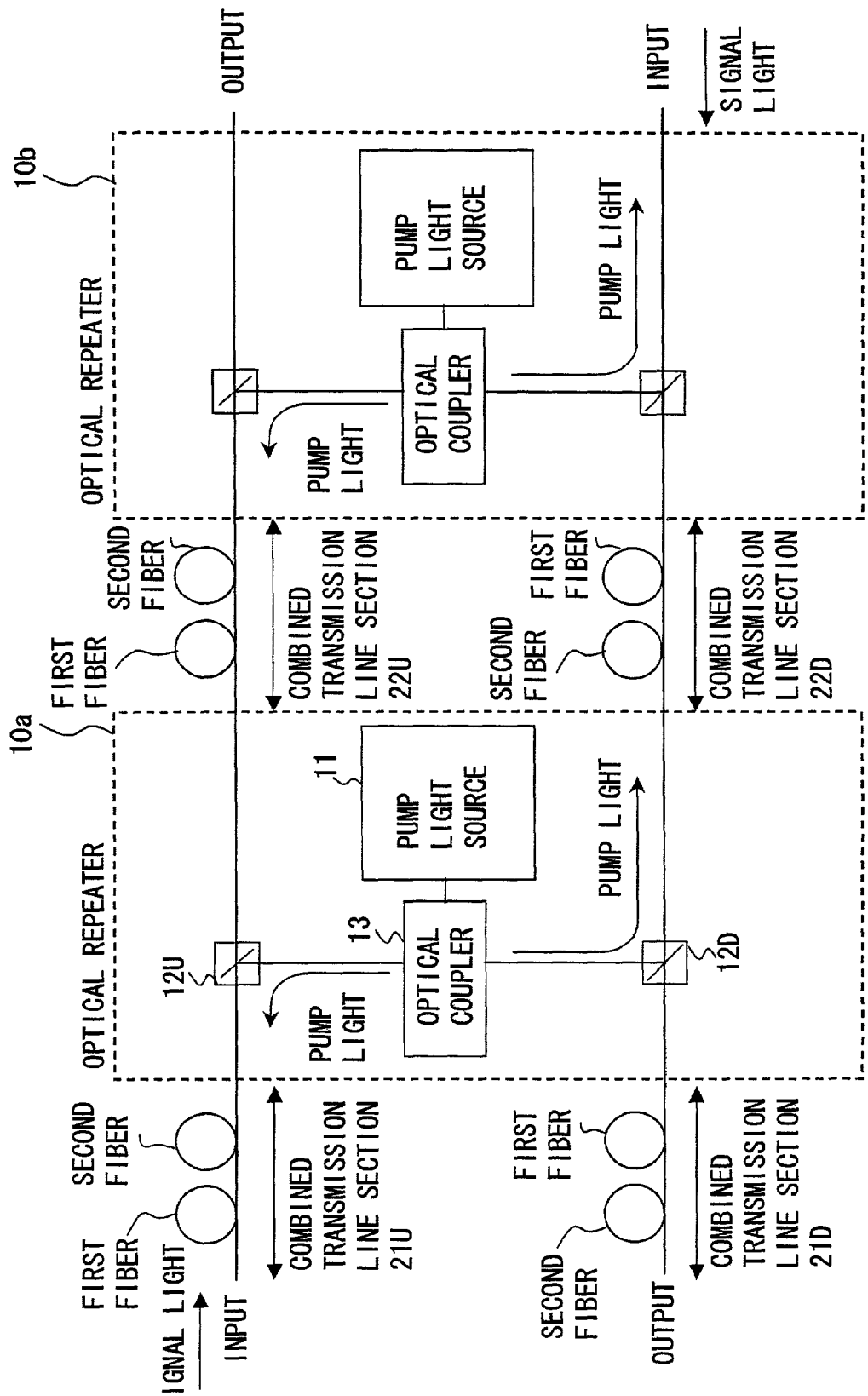
FIG. 13 shows an optical repeater for performing Raman amplification for both an up-stream line and a down-stream line.

FIG. 13 shows the configuration of an optical repeater for performing Raman amplification for both up-stream and down-stream lines. In this example, an up-stream line is composed of combined transmission line sections 21U, 22U, . . . , and a down-stream line is composed of combined transmission line sections 22D, 21D, . . . .

Each optical repeater comprises a pump light source 11 which generates pump light for Raman amplification, an optical coupler 13 for splitting the pump light, and multiplexers 12U and 12D for guiding the pump light split by the optical coupler 13 to up-stream line and down-stream line, respectively. The pump light source 11 can generate pump light with a specific wavelength or a plurality sets of pump light with different wavelengths. The optical coupler 13 works as a optical splitter for splitting the pump light generated by the pump light source 11 at a prescribed ratio (for example, 1:1). Each of the multiplexers 12U and 12D inputs the pump light split by the optical coupler 13 to a corresponding second optical fiber. Specifically, for example, the pump light generated in an optical repeater 10a is inputted both to the second optical fiber of the combined transmission line section 21U, which is a part of the up-stream line, and to the second optical fiber of the combined transmission line section 22D, which is a part of the down-stream line.

In the configuration described above, signal light (multi-wavelength light) outputted from an optical terminal station or an adjacent optical repeater is transmitted through a combined transmission line section and reaches the relevant optical repeater. Here, this signal light is first transmitted through the first optical fiber and then through the second optical fiber. As described above, the first optical fiber is a positive-dispersion fiber with a fairly large mode field diameter and the second optical fiber is a negative-dispersion fiber with a fairly small mode field diameter. Then, the signal light that has reached the optical repeater is guided to a subsequent combined transmission line section through the multiplexer 12.

In the transmission system of this embodiment, two types of combined transmission line sections (combined transmission line sections (+D) and (−D)) are used, as described above. The respective ratios in length between the first and second optical fibers of combined transmission line sections (+D) and (−D) differ from each other. In this embodiment, the first optical fiber of the combined transmission line section (−D) is shorter than the first optical fiber of the combined transmission line section (+D). Conversely, the second optical fiber of the combined transmission line section (−D) is longer than the second optical fiber of the combined transmission line section (+D). Since the mode field diameter of the second optical fiber is smaller than that of the first optical fiber, the second optical fiber has higher Raman efficiency than the first optical fiber. Thus, the combined transmission line section (−D) has higher Raman efficiency than the combined transmission line section (+D).

Therefore, if the pump light of the same optical power is supplied to both of the combined transmission line sections (+D) and (−D), the gain of the combined transmission line section (−D) becomes larger than that of the combined transmission line section (+D).

This problem must be taken into consideration, particularly in a system in which an optical repeater collectively performs the Raman amplification of a plurality of lines. For example, although the pump light generated in the optical repeater 10a shown in FIG. 13 is supplied to both the combined transmission line sections 21U and 22D, difference in gain occurs between the up-stream line and down-stream line if one of these combined transmission line sections is (+D) and the other is (−D).

FIGS. 14 through 17 show examples of the transmission system designed to solve this problem. In the following description, a transmission system is assumed in which a pair of optical terminal stations are connected by up-stream line and down-stream line, and a plurality of optical repeaters are provided on those lines.

Figure 14:
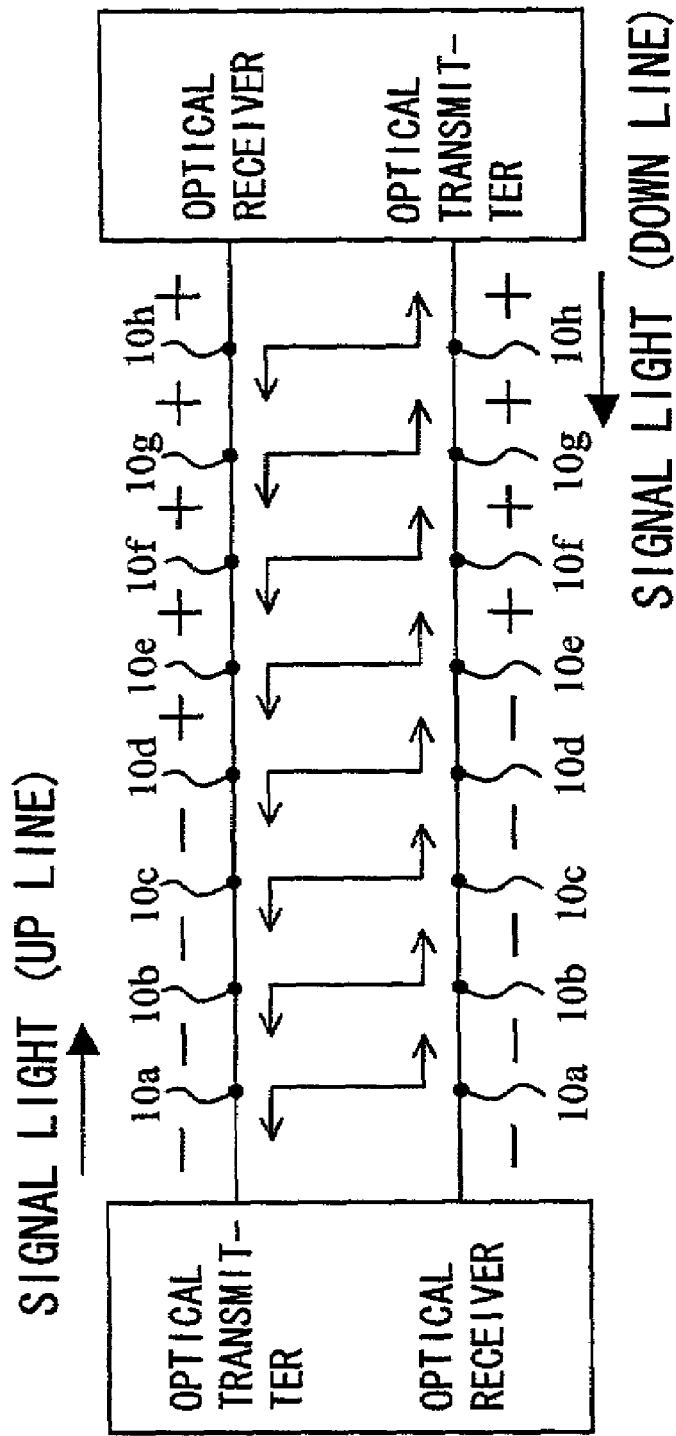
FIG. 14 through FIG. 17 show the configuration of a transmission system taking into consideration the gain balance between an up-stream line and a down-stream line.

In the system shown in FIG. 14, eight optical repeaters (optical repeaters 10a through 10h) are provided on a transmission line between optical terminal stations. Specifically, each of up-stream line and down-stream line is composed of nine sets of combined transmission line sections. Each optical repeater is configured as shown in FIG. 13. In FIG. 14, one optical repeater is represented by a set of black round points marked on the lines.

On the up-stream line of the transmission system, a combined transmission line sections (−D) is located in each of the first four sections started from the transmitting side, and a combined transmission line sections (+D) is located in each of the subsequent five sections. On the down line, a combined transmission line sections (+D) is located in each of the first four sections started from the transmitting side, and a combined transmission line sections (−D) is located in each of the subsequent five sections. The final sections of the up-stream line and down-stream line can be either a combined transmission line section (+D) or (−D). However, accumulated wavelength dispersion due to the difference in number between combined transmission line sections (+D) and (−D) in each line must be compensated for in either of the optical terminal stations. For example, on the up-stream line shown in FIG. 14, since the number of combined transmission line sections (+D) is more by one than that of the combined transmission line sections (−D), wavelength dispersion due to one set of combined transmission line section (+D) must be compensated for in either of the optical terminal stations.

In the transmission system shown in FIG. 14, pump light generated by each optical repeater is always supplied to a set of combined transmission line sections with the same characteristic. In the embodiment, pump light generated in each of optical repeaters 10a through 10d is supplied to a combined transmission line section (−D) in the up-stream line and a combined transmission line section (−D) in the down-stream line. Similarly, pump light generated in each of optical repeaters 10e through 10h is supplied to a combined transmission line section (+D) in the up-stream line and a combined transmission line section (+D) in the down-stream line.

In this way, in this transmission system, when each optical repeater collectively performs the Raman amplification for the up-stream line and down-stream line, pump light generated by each optical repeater is supplied to a set of combined transmission line sections with the same characteristic. Thus, if each optical repeater supplies a set of pump light with the same optical power to the up-stream line and down-stream line, the respective gain of corresponding combined transmission line sections of the up-stream line and down-stream line become equal. Therefore, in this transmission system, the respective Raman amplification of the up-stream line and down-stream line can be simultaneously adjusted by controlling the output power of the pump light source in each optical repeater.

Figure 15:
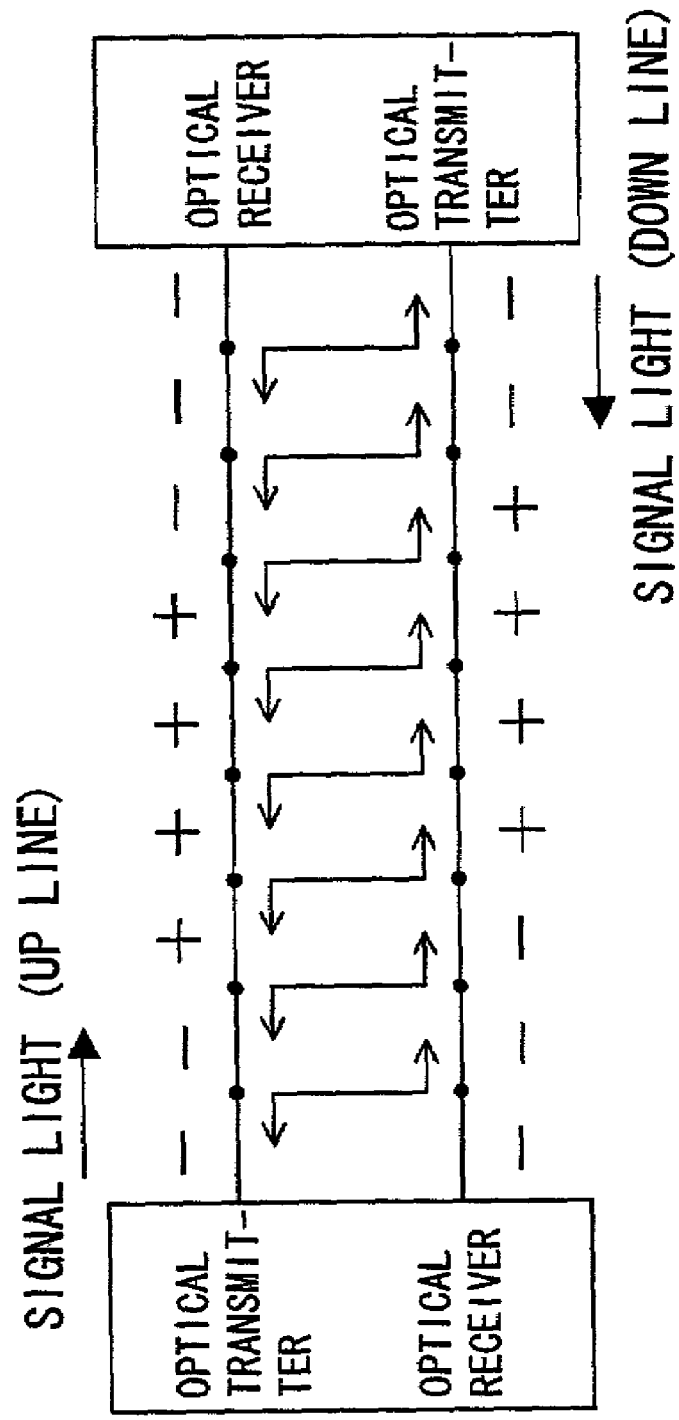

The transmission system shown in FIG. 15 differs in the location of combined transmission line sections from the transmission system shown in FIG. 14. Specifically, in this system, in both the up-stream line and down-stream line, a combined transmission line section (−D) is located in each of the first two sections started from the transmitting side, a combined transmission line section (+D) is located in each of the subsequent four sections and a combined transmission line section (+D) is located in each of the last three sections. Either a combined transmission line section (+D) or (−D) can be located in the respective final sections of the up-stream line and down-stream line, as in the system shown in FIG. 14.

In this configuration too, since pump light generated by each optical repeater is supplied to combined transmission line sections with the same characteristic, the respective Raman amplification of the up-stream line and down-stream line can be simultaneously adjusted by controlling the output power of the pump light source in each optical repeater. In this transmission system, the respective dispersion maps of the up-stream line and down-stream line become the same.

Figure 16:
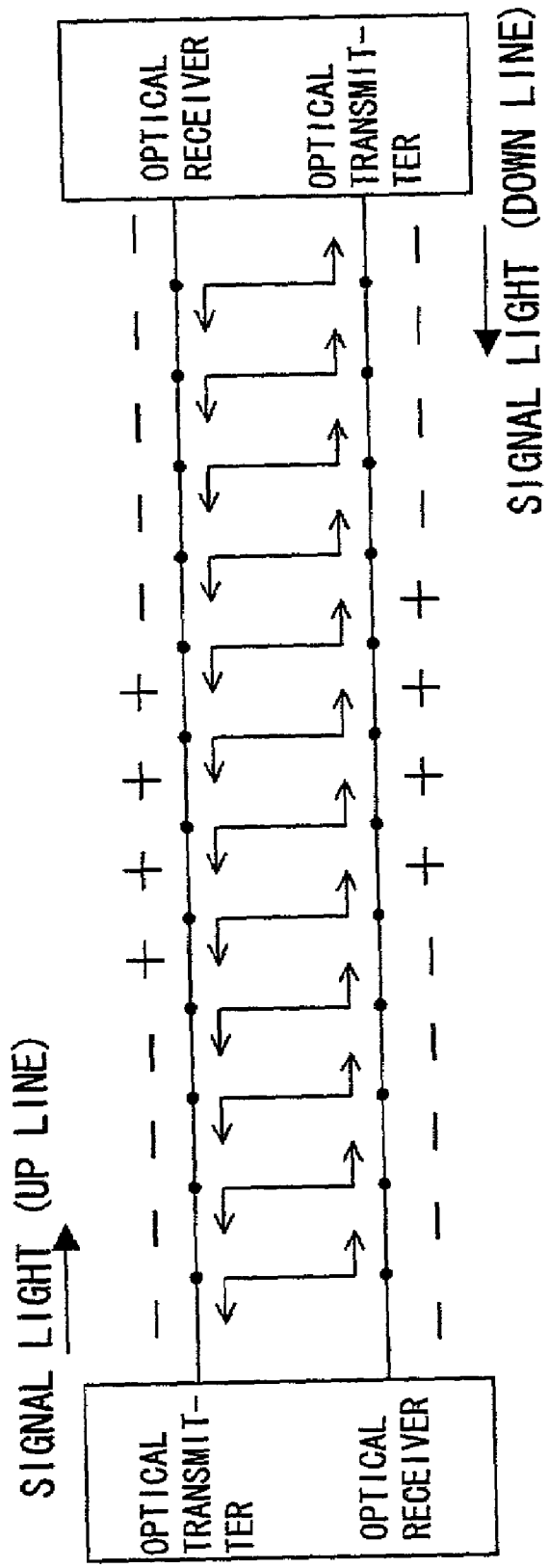

In the transmission system shown in FIG. 16, 12 optical repeaters are provided on a transmission line between optical terminal stations. Specifically, each of the up-stream line and down-stream line is composed of 13 sets of combined transmission line sections. In this transmission system, in both of the up-stream line and down-stream line, a combined transmission line sections (−D) is located in each of the first four sections, a combined transmission line section (+D) is located in each of the subsequent four sections, and a combined transmission line section (−D) is located in each of the last five sections. Either a combined transmission line section (+D) or (−D) can be located in the respective final sections of the up-stream line and down-stream line, as in the system shown in FIG. 14. In this configuration, the number of combined transmission line sections (−D) is more by five than that of the combined transmission line sections (+D). Therefore, in this system, accumulated wavelength dispersion due to five sets of combined transmission line sections (−D) must be compensated for in either of the optical terminal stations.

Figure 17:
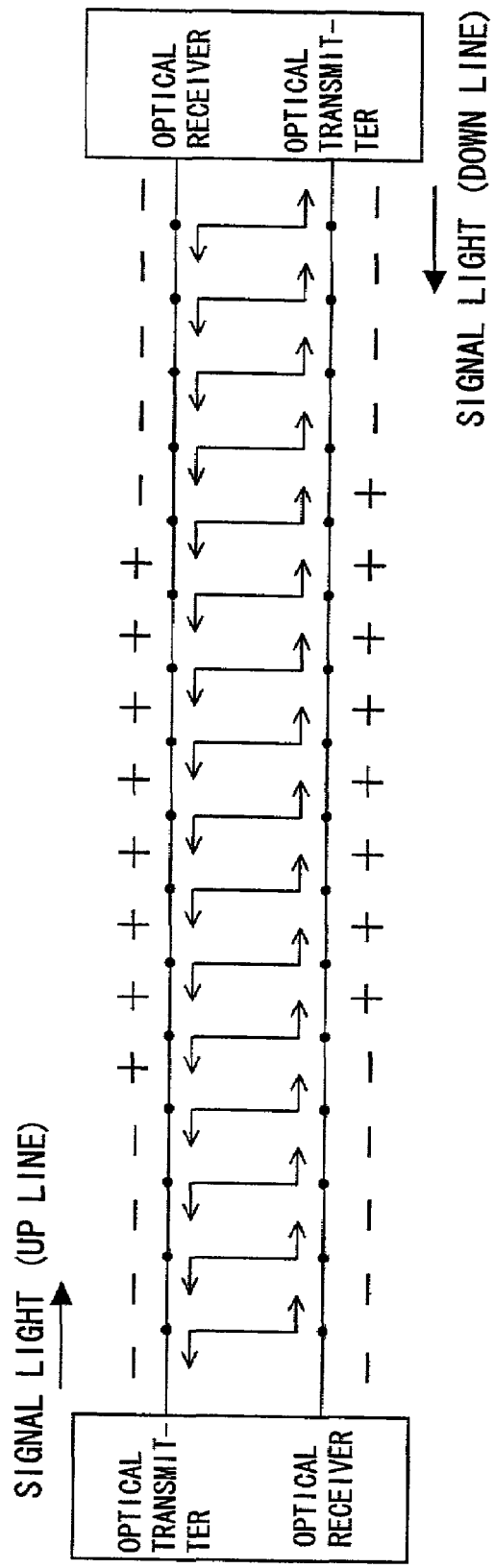

In the transmission system shown in FIG. 17, 16 optical repeaters are provided on a transmission line between two optical terminal stations. Specifically, each of the up-stream line and down-stream line is composed of 17 sets of combined transmission line sections. In this transmission system, in both of the up-stream line and down-stream line, a combined transmission line sections (−D) is located in each of the first four sections started from the transmitting side, a combined transmission line section (+D) is located in each of the subsequent eight sections, and a combined transmission line section (−D) is located in each the last five sections. Either a combined transmission line sections (+D) or (−D) can be located in the respective final sections of the up-stream line and down-stream line, as in the system shown in FIG. 14. In this transmission system, the dispersion map shown in FIG. 12 is obtained.

In the examples shown in FIGS. 14 through 17, since the transmission system is configured in such a way that pump light generated by each optical repeater is supplied to a set of combined transmission line sections with the same characteristic, the number of combined transmission line sections composing the transmission line is basically odd. On the contrary, in the following configurations, the number of combined transmission line sections composing a transmission line is not limited.

Figure 18:
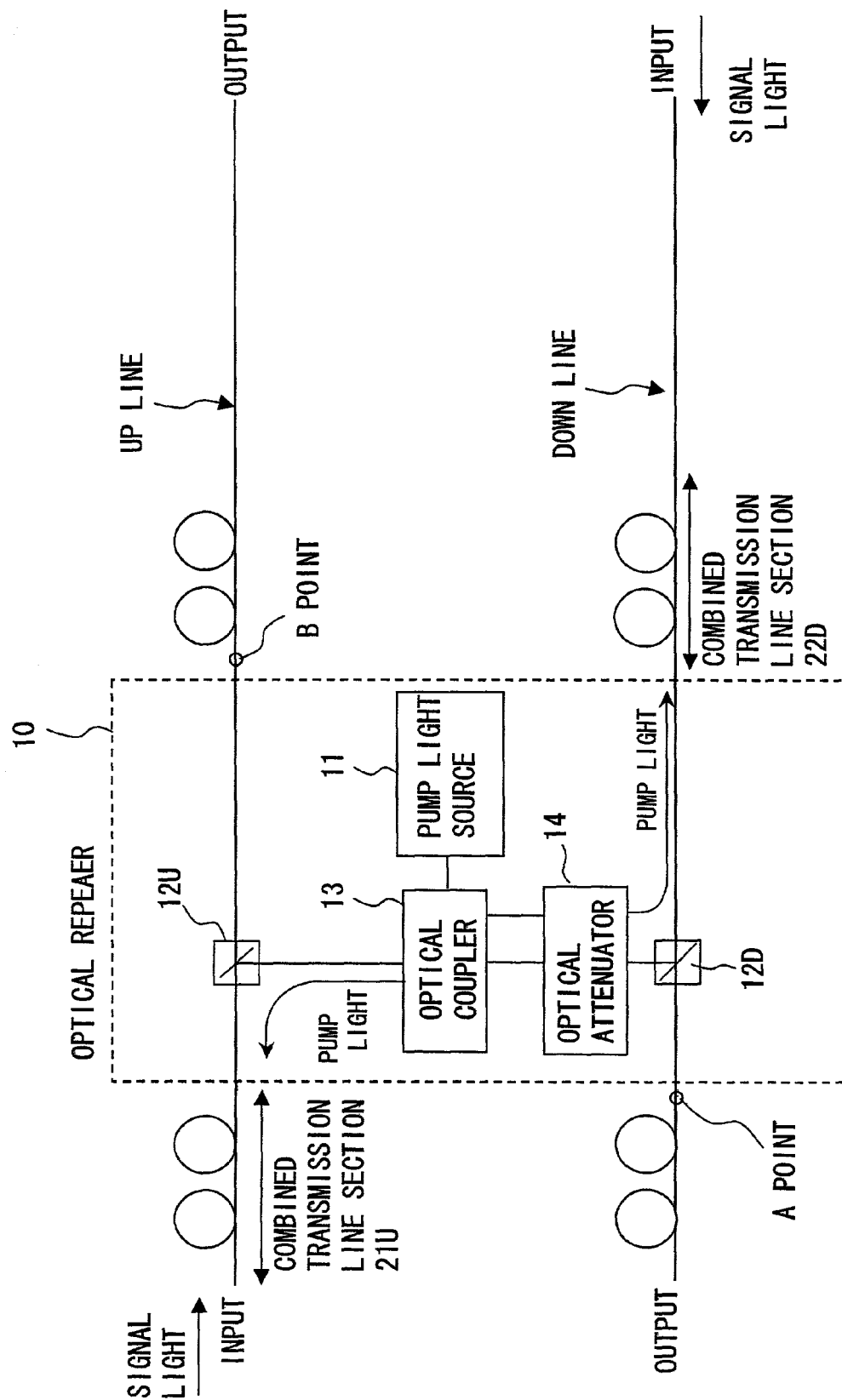
FIG. 18 shows the configuration of another embodiment of an optical repeater for performing Raman amplification for both an up-stream line and a down-stream line.

FIG. 18 shows the configuration in another embodiment of the optical repeater which performs Raman amplification for both up-stream line and down-stream line. This optical repeater comprises an optical attenuator 14 in addition to the pump light source 11, optical coupler 13, multiplexers 12U and 12D which are shown in FIG. 13. The optical attenuator 14 adjusts the optical power of pump light to be supplied to the up-stream line or down-stream line. In this embodiment, the optical coupler 14 is provided between the optical coupler 13 and multiplexer 12D, and adjusts the optical power of pump light to be supplied to the down-stream line. The optical attenuator 14 can be a variable optical attenuator or an optical attenuator with a fixed attenuation amount. A device for adjusting optical power (for example, optical amplifier) can also be used instead of the optical attenuator 14.

The optical repeater 10 in this embodiment can supply pump light with different optical power to each of the up-stream line and down-stream line. However, if the optical splitting ratio of the optical coupler 13 is 1:1 and if the attenuation amount of the optical attenuator is zero, pump light of the same power is supplied to each of the up-stream line and down-stream line.

If one of the combined transmission line sections 21U and 22D is the combined transmission line section (+D) and the other is the combined transmission line section (−D), the optical repeater 10 supplies each of the up-stream line and down-stream line with pump light having different optical power. As described above, if pump light with the same optical power is supplied to the combined transmission line sections (+D) and (−D), the gain of the combined transmission line section (−D) becomes larger than that of the combined transmission line section (+D). Therefore, to make the respective gain of the up-stream line and down-stream line equal, the optical power of pump light to be supplied to the combined transmission line section (−D) must be lower than that to be supplied to the combined transmission line section (+D).

In this case, if the transmission system is designed based on the variety of parameters described with reference to FIGS. 6 through 8, the attenuation amount of the optical attenuator 14 should be approximately 0.5 dB. However, if the optical splitting ratio of the optical coupler 13 is modified from 1:1 to 47:53 in FIG. 12, the same effect can be obtained.

Figure 19:
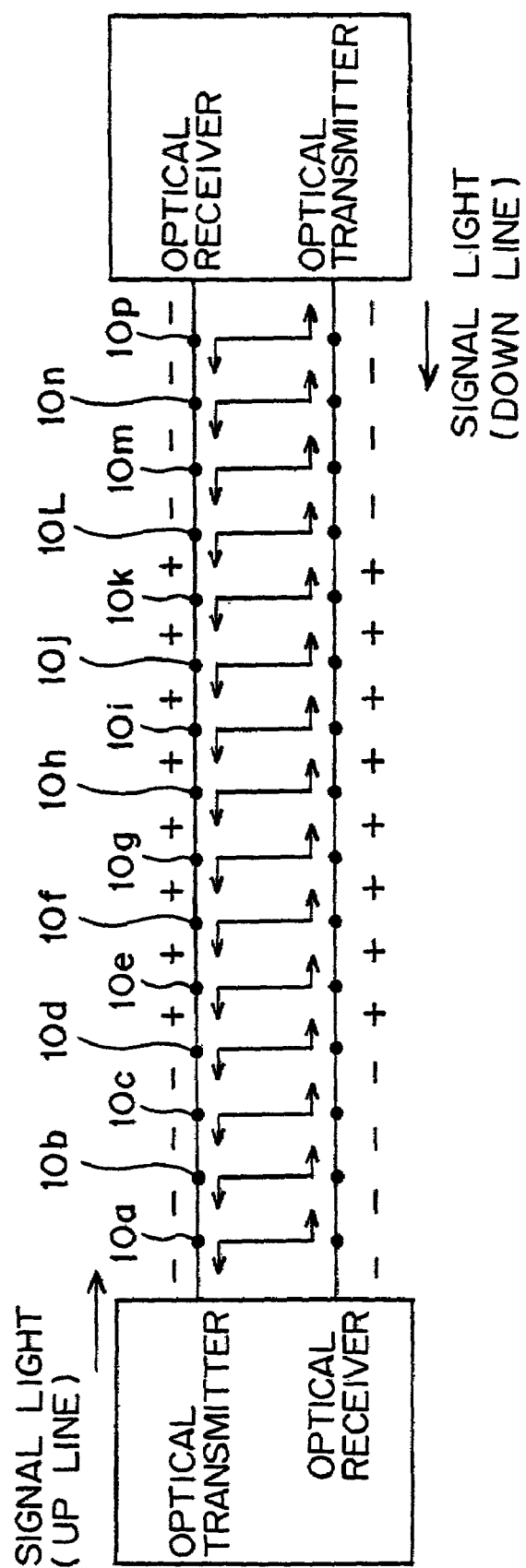
FIG. 19 shows a configuration of a transmission system using the optical repeater shown in FIG. 18.

FIG. 19 shows a configuration of the transmission system using the optical repeater shown in FIG. 18. In this configuration, 15 optical repeaters (10a through 10n, 10p) are provided on a transmission line between a pair of optical terminal stations. Specifically, each of the up-stream line and down-stream line is composed of 16 combined transmission line sections. In both of the up-stream line and down-stream line, a combined transmission line section (−D) is located in each of the first four sections, a combined transmission line section (+D) is located in each of the subsequent eight sections, and a combined transmission line section (−D) is located in each of the last four sections.

The optical repeater 10d supplies pump light to combined transmission line sections (−D) in the up-stream line and combined transmission line sections (+D) in the down-stream line. Therefore, the optical repeater 10d makes the optical power of the pump light to be supplied to the up-stream line lower than that to be supplied to the down-stream line. For this purpose, in FIG. 18, the optical attenuator 14 is provided between the optical coupler 13 and multiplexer 12U. The optical repeater 10L supplies pump light to combined transmission line sections (+D) in the up-stream line and combined transmission line sections (−D) in the down-streamline. Therefore, the optical repeater 10L makes the optical power of pump light to be supplied to the down-stream line lower than that to be supplied to the up-stream line.

Since each of the other optical repeaters supplies pump light to a set of combined transmission line sections with the same characteristic, there is no need to attenuate one of the respective pump light to be supplied to the up-stream line and down-stream line. Therefore, for the other optical repeaters, the optical repeater shown in FIG. 13 can be used.

In this way, since the respective optical power of pump light to be supplied to the up-stream line and down-stream line can be individually adjusted, the respective dispersion maps of the up-stream line and down-stream line can be made the same. Thus, the transmission system becomes easy to maintain. In addition, no function to compensate for wavelength dispersion is theoretically needed in optical terminal station.

Although in the transmission systems shown in FIGS. 18 and 19, the optical power of each pump light is adjusted so that the respective gains of combined transmission line sections (+D) and (−D) become equal, one of the objectives to match the respective gains is to match the respective signal light levels of the up-stream line and down-stream line. Thus, the respective signal light levels of the up-stream line and down-stream line can also be matched by providing a function to adjust optical power at point A or B shown in FIG. 18. The method for adjusting optical power at point A or B can be implemented, for example, by connecting or fusing optical fibers by a prescribed method and causing optical loss of approximately 0.1 to 1 dB. For example, if the combined transmission line sections 21U and 22D are (+D) and (−D), respectively, prescribed loss should be generated at point A.

Figure 20:
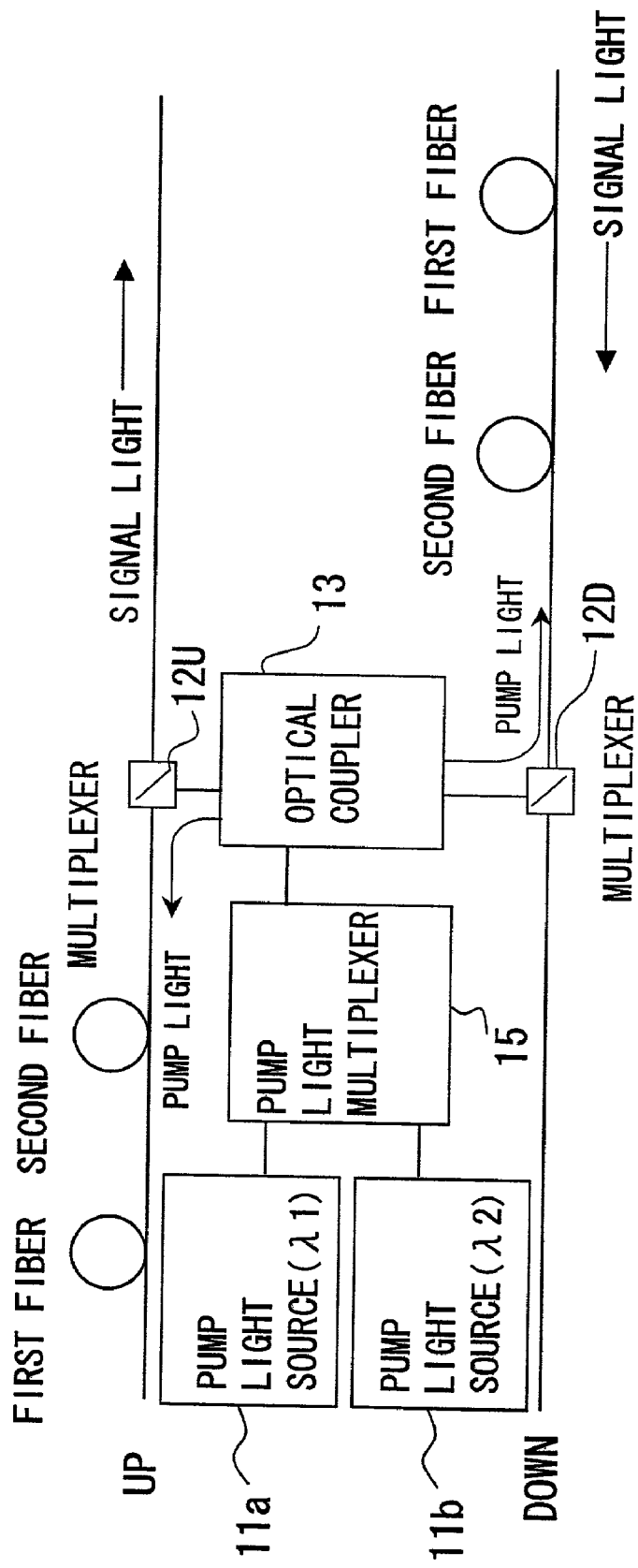
FIG. 20 shows an optical repeater for supplying a plurality of lines with a plurality sets of pump light.

FIG. 20 shows the configuration of an optical repeater for supplying each of a plurality of lines with a plurality sets of pump light. In Ram an amplification, a gain can be obtained over a wide band by supplying an optical fiber with a plurality sets of pump light with different wavelengths.

Each optical repeater comprises a plurality of pump light sources 11a and 11b for generating a plurality sets of pump light with different wavelengths and a pump light multiplexer 15 for multiplexing the plurality sets of pump light. For example, a polarized wave multiplexer, a wavelength multiplexer or WDM coupler can implement the pump light multiplexer 15. Pump light multiplexed by the pump light multiplexer 15 is split by the optical coupler 13, and each piece of pump light split by the optical coupler 13 is guided to both the up-stream line and down-stream line by the multiplexers 12U and 12D, respectively. In other words, multiplexed pump light, including a plurality sets of pump light (λ1, λ2) is supplied to both the up-stream line and down-streamline. For the up-stream line and down-stream line, the lines shown in FIGS. 17 and 18 are used.

Figure 21:
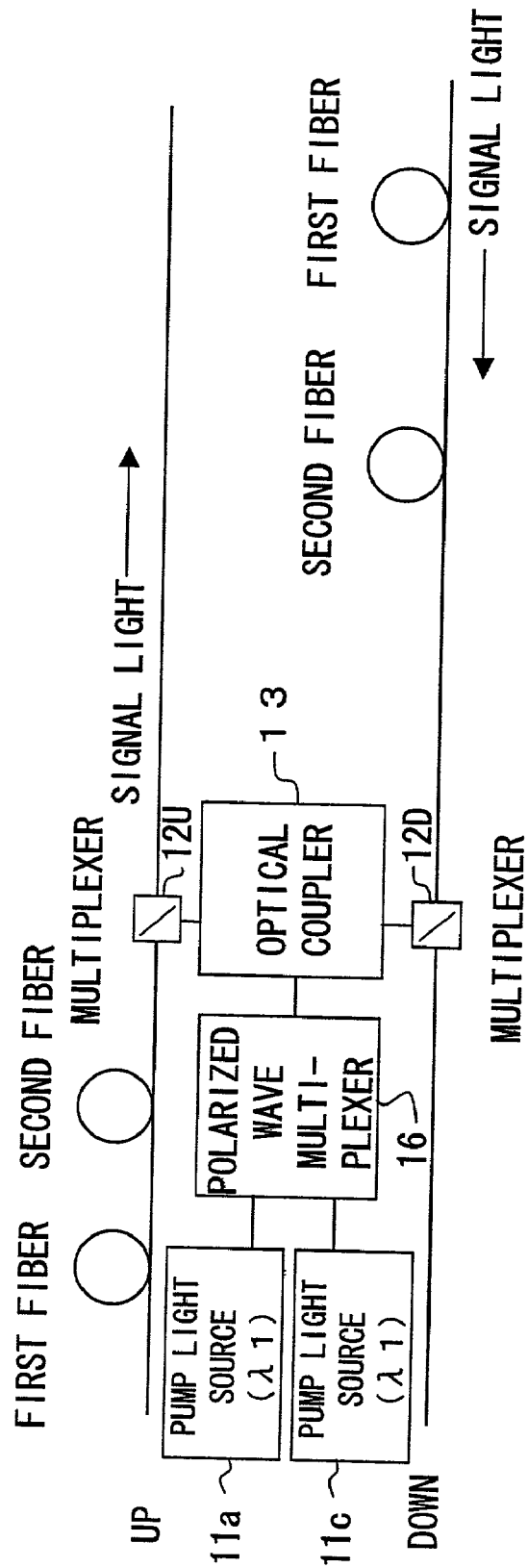
FIG. 21 shows a configuration of an optical repeater in another embodiment.

FIG. 21 shows a configuration of the optical repeater in another embodiment. This repeater comprises a plurality of pump light sources 11a and 11c for generating a plurality sets of pump light with the same wavelengths, and a polarized wave multiplexer 16 for multiplexing the plurality sets of pump light. The plurality sets of pump light multiplexed by the polarized wave multiplexer 16 is split by the optical coupler 13, and pump light split by the coupler 13 are guided to the up-stream line and down-stream line, respectively. By this configuration, pump light is depolarized.

In FIG. 21, the plurality of pump light sources 11a and 11c can generate pump light with different wavelengths.

Figure 22:
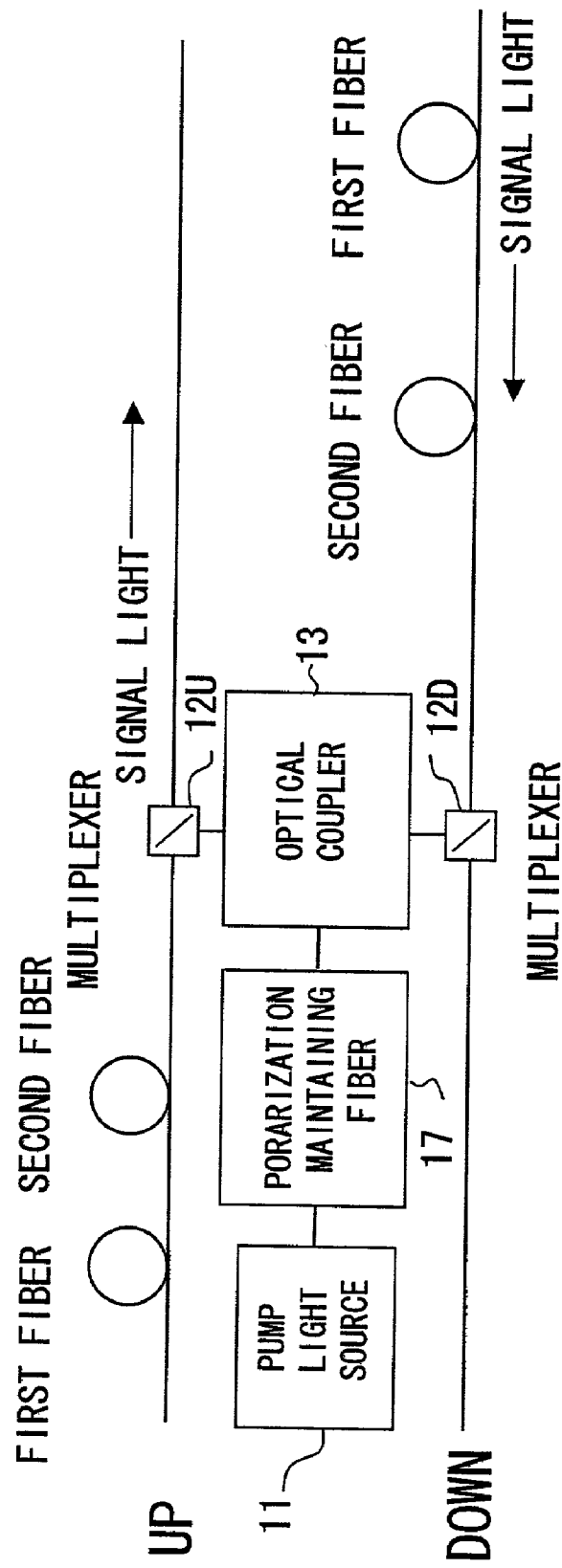
FIG. 22 shows a configuration of an optical repeater in further embodiment.

FIG. 22 shows a configuration of the optical repeater in still another embodiment. In this repeater, pump light generated by the pump light source 11 is guided to the optical coupler 13 through a polarization maintaining fiber 17. Then, pump light depolarized by the polarization maintaining fiber 17 is supplied to both the up-stream line and down-stream line.

Next, a design method for canceling a chirp (or chirping) due to cross-phase modulation (XPM) is described.

Figure 23A:
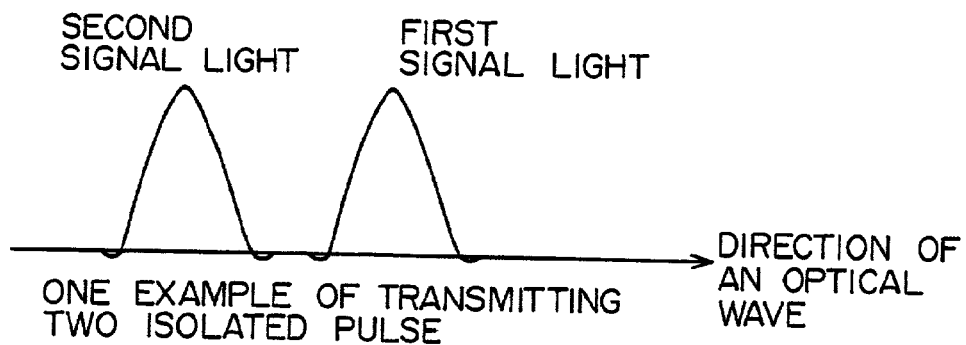
FIGS. 23A through 23C show chirps due to self-phase modulation.
Figure 23B:
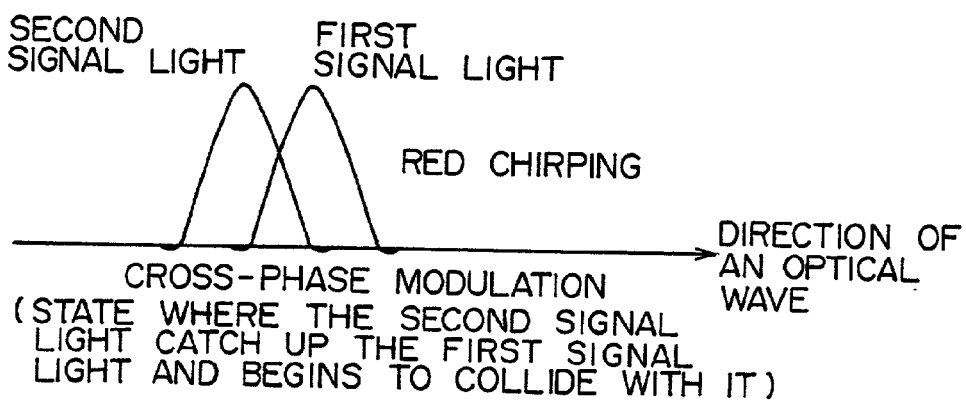
Figure 23C:
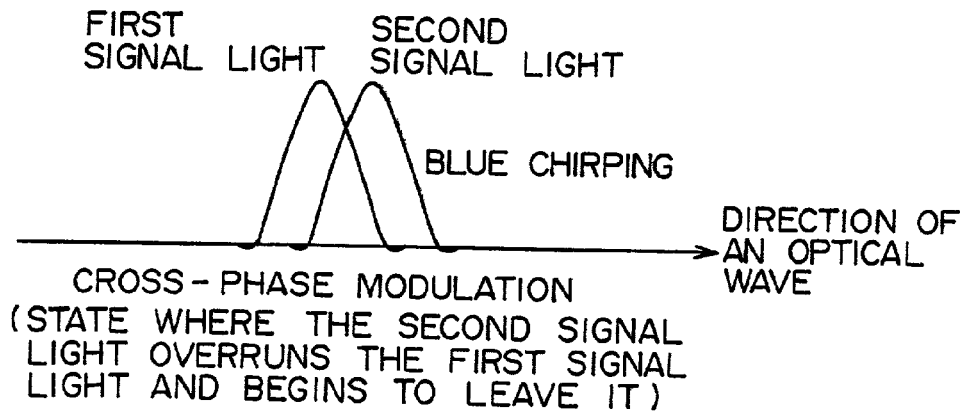

FIG. 23A through 23C show chirps due to cross-phase modulation. Chirps due to cross-phase modulation are caused by the difference in speed between light with different wavelengths. In this example, it is assumed that there are two pieces of signal light (isolated optical pulses) with different wavelengths in an optical fiber, as shown in FIG. 23A. It is also assumed that the speed of the second signal light is higher than that of the first signal light.

When, as shown in FIG. 23B, the second signal light catches up the first signal light and begins to collide with the first signal light, the optical strength sharply increases. Thus, a red chirp is caused. A red chirp is a phenomenon that an optical wavelength shifts to the longer wavelength side. When, as shown in FIG. 23C, the second signal light overruns the first signal light and begins to leave the first signal light, the optical strength sharply decreases. Thus, a blue chirp is caused. A blue chirp is a phenomenon that an optical wavelength shifts to the shorter wavelength side.

If the optical power of these pieces of signal light are constant during from when the second signal light catches up with the first signal light and until the second signal light overruns the first signal light, that is, during from when a red chirp occurs until a blue chirp occurs, the red chirp and blue chirp cancels each other. However, since it takes a prescribed time for the second signal light to catch up with the first signal light and to overrun the first signal light, these pieces of signal light are transmitted for a considerable distance during this period. In other words, a position on the transmission line where red chirp occurs is away by a considerable distance from a position where blue chirp occurs. Here, since an optical repeater is provided on the transmission line and optical signal is attenuated on the transmission line, the optical power of the signal light at a timing when red chirp occurs is different from that of the signal light at a timing when blue chirp occurs. Therefore, the red chirp and blue chirp do not cancel each other.

Figure 24:
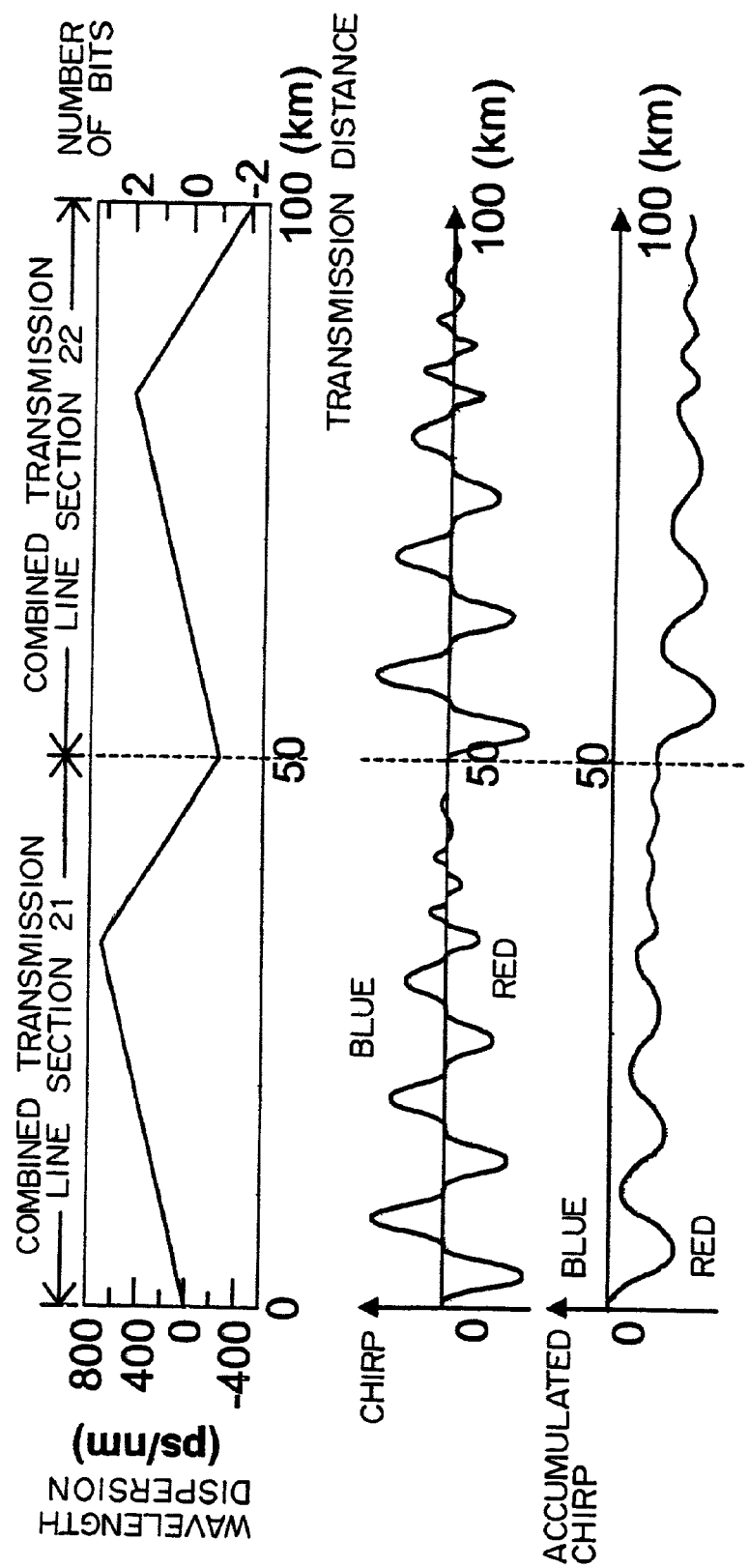
FIG. 24 shows the residuum of a red chirp or blue chirp.

FIG. 24 shows the residuum of a red or blue chirp. In this embodiment, a case where signal light is transmitted through combined transmission line sections 21 and 22 is shown. The combined transmission line sections 21 and 22 have the same structure. Specifically, each of the combined transmission line sections 21 and 22 is composed of the first optical fiber, which is a positive-dispersion fiber, and the second optical fiber, which is a negative-dispersion fiber. The length of the combined transmission line section is 50 km and average wavelength dispersion of it is −5 ps/nm/km. In this transmission system, the wavelength range of signal light is 1.55 μm band, the wavelength interval of signal lights is 50 GHz, and transfer rate of signal is 10 Gbps. Here, 50 GHz corresponds to approximately 0.4 nm at 1.55 μm band. In other words, a plurality of signal light are located at intervals of approximately 0.4 nm.

In the transmission system described above, it is assumed that two signal lights with adjacent wavelengths are transmitted through the combined transmission line sections 21 and 22, and a pulse of one of the signal light overruns a pulse of the other signal light. When a pulse of one of the signal lights overruns a pulse of the other signal light, both a red chirp and a blue chirp occur, as described above. In this embodiment, the signal lights are transmitted from an optical repeater or optical terminal, in the combined transmission line section 21, first, a red chirp occurs, and then a blue chirp occurs. After that, red and blue chirps alternately occur.

However, as described with reference to FIG. 4, in a combined transmission line section, the optical power of signal light is at the highest level immediately after the signal light is transmitted from an optical repeater or optical terminal and is gradually attenuated. Therefore, the maximum chirp (red chirp in this embodiment) occurs immediately after the signal light is output from an optical repeater or optical terminal and after that, gradually diminishes. Accordingly, red and blue chirps that alternately occur in the combined transmission line section 21 do not completely cancel each other, and one of the chirps is left at the output terminal of the combined transmission line section 21. In the example shown in FIG. 24, a red chirp remains. The signal lights with this remaining chirp are inputted to the combined transmission line section 22.

However, in the transmission system based on the parameters described above, when signal light is transmitted through the combined transmission line section 21, approximately −250 ps/nm (=−5ps/nm/km×50 km) of wavelength dispersion occurs. Thus, approximately 100 ps (=250 ps/nm×0.4 nm) of wavelength dispersion occurs between adjacent signal lights. In this transmission system, the transmission rate of the signal is 10 Gbps. That is, time assigned to each bit of a transmitting signal is 100 ps. Therefore, in this transmission system, when two pieces of signal light with an adjacent wavelength are transmitted through the combined transmission line section 21, the signals transmitted using the signal lights is shifted by one bit from the other. Therefore, when two signals carried by the signal lights are inputted to the combined transmission line section 22, the phase relation between the two signals is the same as that obtained when the signals are inputted to the combined transmission line section 21.

As a result, the same chirp as occurs in the combined transmission line section 21 occurs in the combined transmission line section 22. In other words, in the combined transmission line section 22 too, red and blue chirps do not completely cancel each other and a new red chirp remains as in the combined transmission line section 21. As a result, the chirps that occur in the combined transmission line sections 21 and 22 are accumulated to cause a larger chirp.

This problem is caused by one-bit-shift between two signals which are carried by signal lights with adjacent wavelengths, when the signal lights are transmitted through a combined transmission line section. Therefore, if a variety of transmission parameters are set so that this bit shift may become 0.5 bits, the problem will be solved.

Figure 25:
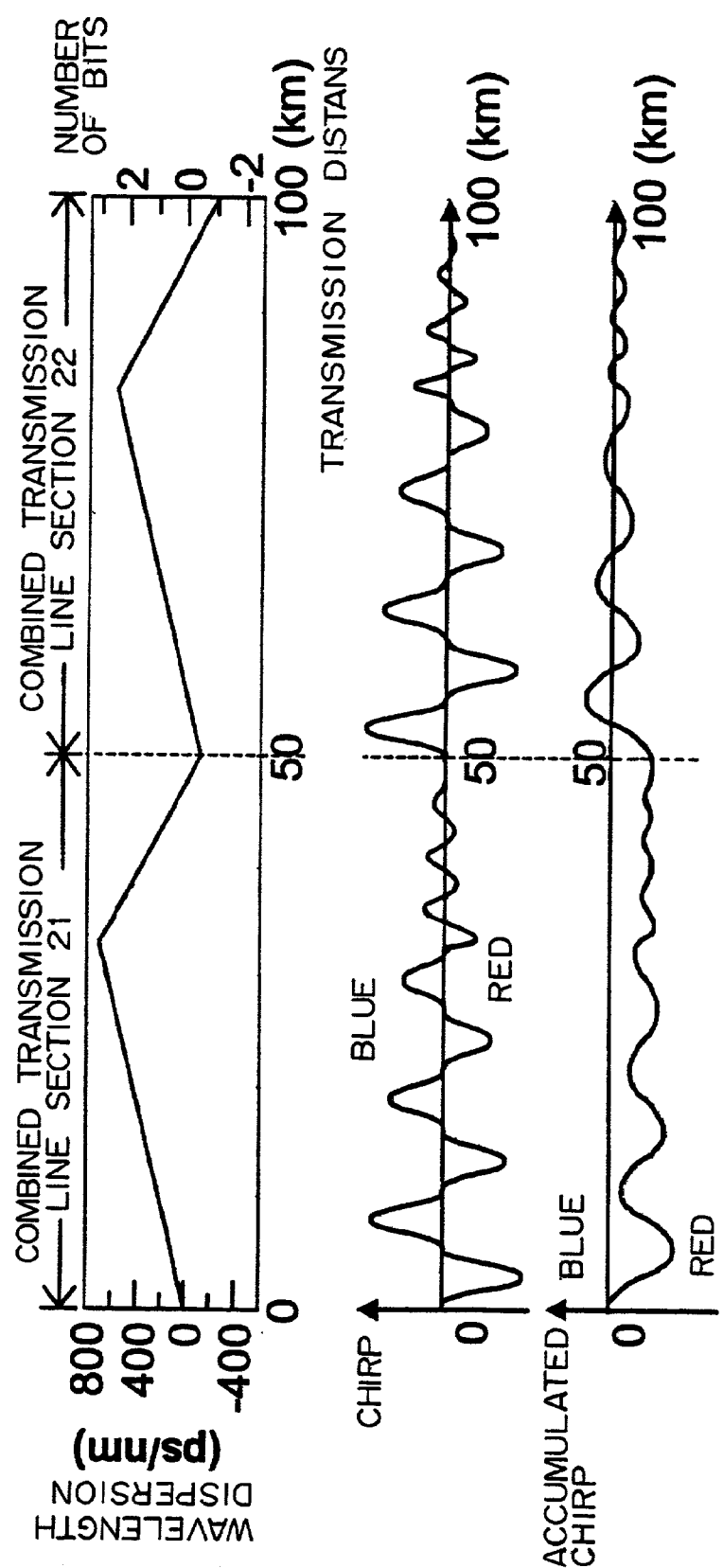
FIG. 25 shows the transmission characteristic of a transmission system designed so that a chirp can be canceled by each other.

FIG. 25 shows the transmission characteristic of a transmission system designed so that chirps can be canceled by each other. In this embodiment, the average wavelength dispersion of each combined transmission line section is −2.3 ps/nm/km, and the transfer rate of signals are is 10.7 Gbps. In this case, when signal light is transmitted through a combined transmission line section, approximately −115 ps/nm (=−2.3 ps/nm/km×50 km) of wavelength dispersion occurs. In other words, approximately 46 ps (=115 ps/nm×0.4 nm) of wavelength dispersion occurs between two pieces of signal light with adjacent wavelengths. In this transmission system, the transfer rate of signals is 10.7 Gbps. In other words, time assigned to each bit of a transmitting signal is approximately 93 ps. Therefore, in this transmission system, when two pieces of signal light with an adjacent wavelengths are transmitted through a combined transmission line section, signals carried by the signal lights are shifted by approximately 0.5 bits from each other. In other words, the phase relation between two signals obtained when the signal lights are transmitted through the combined transmission line section 21 is completely inverted to that obtained when the signal lights are transmitted through the combined transmission line section 22.

In this embodiment, a blue chirp is dominant in the combined transmission line section 21, and a red chirp is dominant in the combined transmission line section 22. Therefore, if signal light is transmitted through these two sets of combined transmission line sections, chirps caused by cross-phase modulation in the sections are canceled by each other, and the degradation of a transmission waveform is reduced accordingly.

Although in the example described above, the system is designed so that 0.5 bits of phase shift is obtained in one set of combined transmission line sections, the present invention is not limited to this bit amount. For example, if the system is designed so that approximately ⅓ bit of phase shift is caused in each of combined transmission line section, chirps caused by cross-phase modulation are canceled by each other in three sets of combined transmission line sections.

Figure 26:
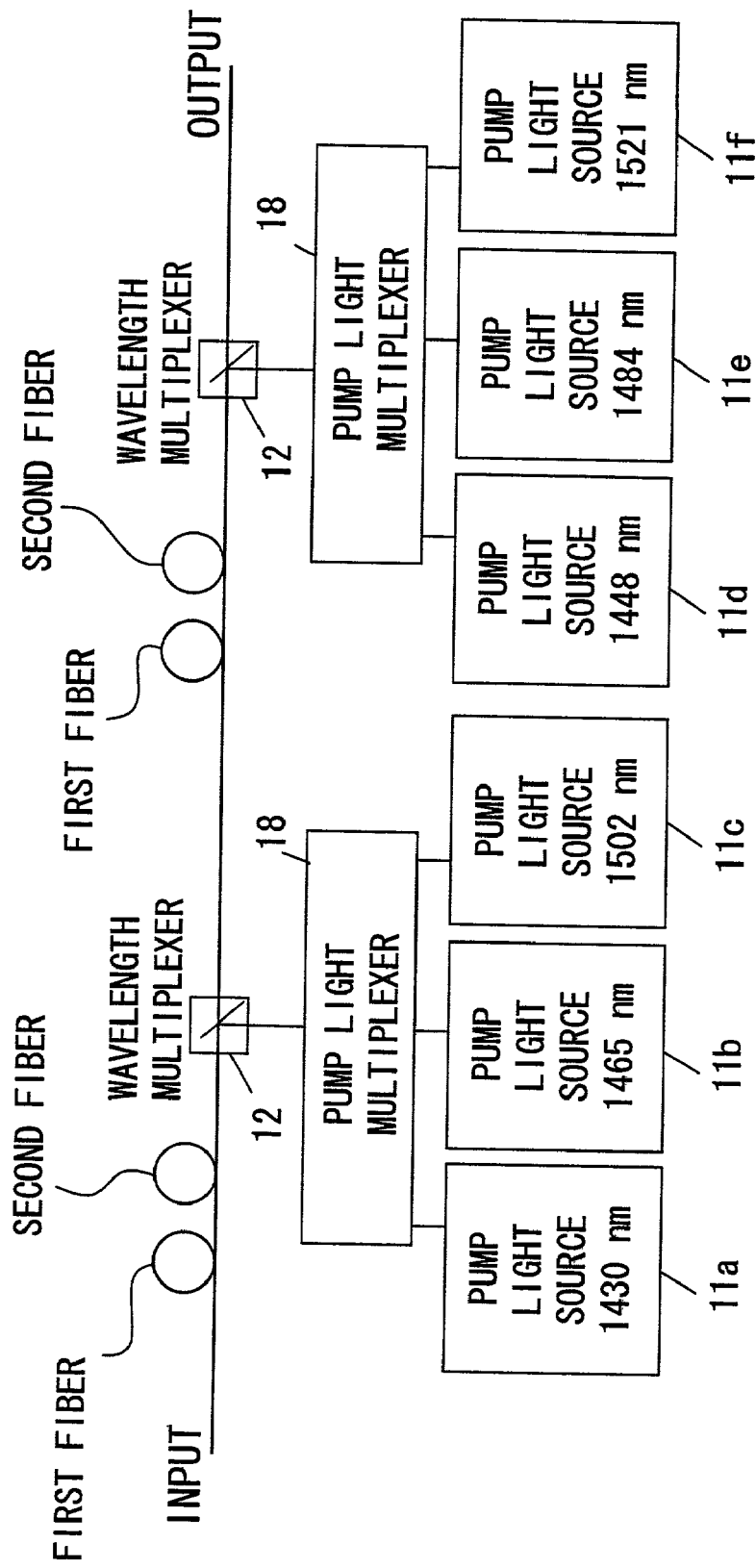
FIG. 26 shows a configuration of the optical transmission system in another embodiment.

FIG. 26 shows the configuration of the optical amplification transmission system in another embodiment. In this transmission system, a wide gain band is obtained and a size of optical repeater is reduced.

In this transmission system, an optical repeater with pump light sources 11a through 11c (first optical repeater) and an optical repeater with pump light sources 11d though 11f (second optical repeater) are alternately provided on a transmission line. It is assumed that the wavelengths of the pump light generated by the pump light sources 11a, 11b and 11c are, for example, 1430 nm, 1465 nm and 1502 nm, respectively, and the wavelengths of the pump light generated by the pump light sources lid, lie and 11f are, for example, 1448 nm, 1484 nm and 1521 nm, respectively. In each optical repeater, a plurality sets of pump light are multiplexed by an pump light multiplexer 18, and the multiplexed pump light is guided to a transmission line by the multiplexer 12. The six sets of pump light are determined so that their wavelengths or frequencies can be assigned at equal intervals. Strictly speaking, the frequency or wavelength of pump light is determined so that Raman gain peak wavelengths are located at equal optical frequency intervals. Thus, by making the respective optical outputs of the wavelengths of a plurality of signal light at the time of cross-phase modulation equal, the respective amounts of red and blue chirps can be almost the same.

FIG. 27 is a list showing the Raman gain peak wavelengths corresponding to the pump light generated by pump light sources 11a to 11f. The Raman gain peak is obtained at a wavelength shifted by approximately 13.2 THz from corresponding pump light wavelength. The wavelengths shown in FIG. 27 are one example and can be modified depending on the wavelength range of signal light.

Figure 28:
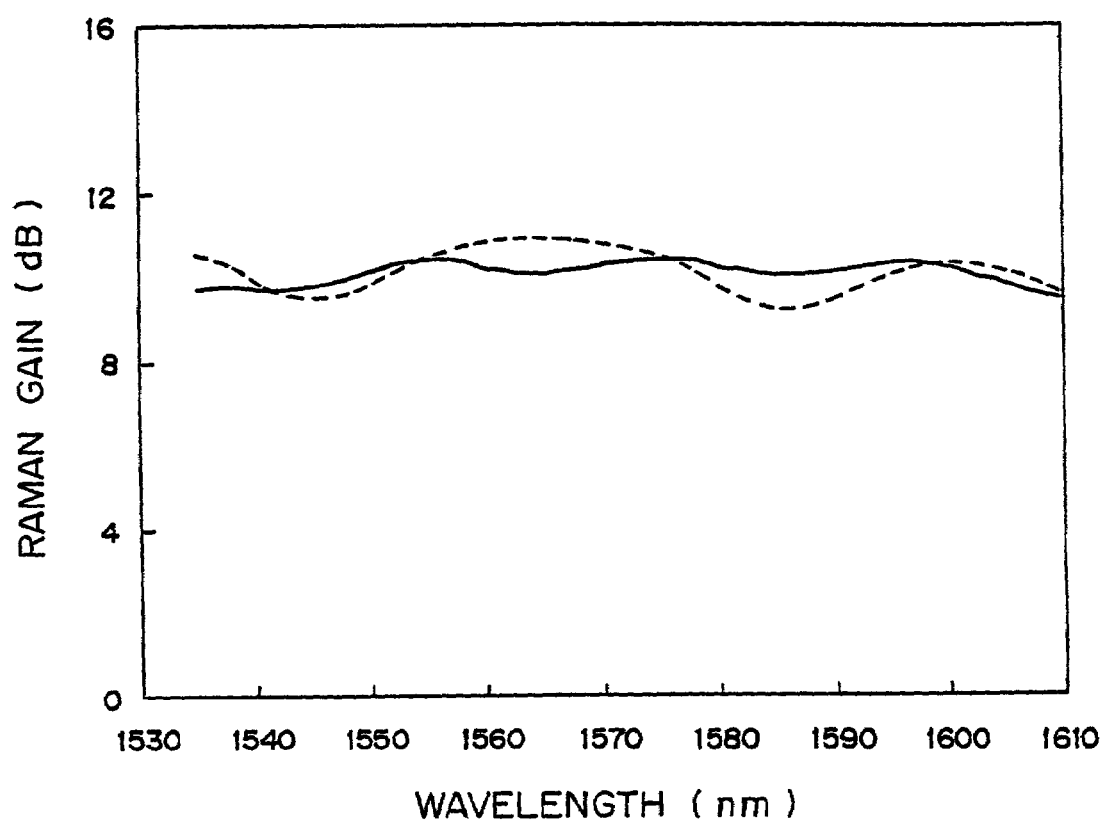
FIG. 28 shows the advantage of the transmission system shown in FIG. 26.

FIG. 28 shows the effect of the transmission system shown in FIG. 26. In FIG. 28, a gain obtained when only the first optical repeaters are provided is represented by a broken line, and a gain obtained when the first and second optical repeaters are alternately provided is represented by a solid line. In the system of this embodiment, the gain deviation is small compared with that of the system with only the first optical repeaters, and the signal light wavelength bandwidth can be expanded. If each optical repeater is provided with pump light sources 11a to 11f, a gain characteristic equal to or better than that of the system shown in FIG. 26 can be obtained. However, as the number of pump light sources increases, both the size and power consumption of an optical repeater become large, which is a disadvantage.

Although in the embodiment described above, two types of optical repeaters are alternately located, the present invention is not limited to this number of types of optical repeaters. For example, an optical repeater with pump light sources 11a and 11e, an optical repeater with pump light sources 11d and 11c, and an optical repeater with pump light sources 11b and 11f can be sequentially located on a transmission line in a system.

In the optical transmission system of this embodiment, a gain equalizer can also be provided on a transmission line. One gain equalizer can be provided in each optical repeater or only one gain equalizer can be provided for a prescribed number of optical repeaters. Alternatively, the gain equalizer can be provided in an optical receiving station.

Furthermore, if a pump light source fails in a certain optical repeater, in another optical repeater or a plurality of the other optical repeaters, the optical power of pump light with the same wavelength as that has been generated by the failed pump light source can be increased. This function can be implemented, for example, by utilizing the invention disclosed in Japanese Patent Laid-open No. 2001-30836.

Since in the optical transmission system of the present invention, a transmission line is composed of at least two types of combined transmission line sections properly located, a transmission characteristic can be improved by reducing the influence of the non-linear effect.

Since pump light for Raman amplification is always inputted to an optical fiber with a small mode field diameter, high Raman gain efficiency can be obtained and no special fiber for Raman amplification is not needed in order to improve the gain.

Furthermore, since a plurality of pump light wavelengths are properly assigned among a plurality of optical repeaters in order to Raman gain with little deviation over a wide band, gain deviation can be reduced and signal light wavelength bandwidth can be expanded without the increase in number of pump light sources used in each optical repeater.

What is claimed is:

1. An optical transmission system in which optical repeaters are provided on a transmission line for transmitting signal light, comprising:
a plurality of combined transmission line sections, each of which is composed of a first optical fiber with positive-dispersion and a second optical fiber with negative-dispersion that is located after the first optical fiber, the second optical fiber having a non-linear effect larger than the first optical fiber; and
a plurality of optical repeaters, each of which is provided between an adjacent pair of the combined transmission line sections and each of which inputs pump light to an output end of the second optical fiber of a preceding combined transmission line section in the backward direction so as to obtain Raman gain in the second optical fiber, wherein
the plurality of combined transmission line sections include a first combined transmission line section with positive accumulated wavelength dispersion and a second combined transmission line section with negative accumulated wavelength dispersion, and wherein
the transmission line is constituted by repeating a basic pattern transmission line section, each of which is composed of one or more first combined transmission line sections and one or more second combined transmission line sections, and an accumulated wavelength dispersion of each said basic pattern transmission line section is substantially zero.

2. The optical transmission system according to claim 1, wherein accumulated wavelength dispersion of each of the combined transmission line sections is adjusted by modifying a ratio in length between the first and second optical fibers.

3. The optical transmission system according to claim 1, wherein accumulated wavelength dispersion of each of the combined transmission line sections is adjusted by modifying a wavelength dispersion characteristic of at least one of the first and second optical fibers.

4. The optical transmission system according to claim 1, wherein the basic pattern transmission line section is composed of 4 to 40 sets of the combined transmission line sections.

5. The optical transmission system according to claim 1, wherein the first combined transmission line sections are located in a former part of the basic pattern transmission line section, and the second combined transmission line sections are located in a latter part of it.

6. The optical transmission system according to claim 1, wherein the second combined transmission line sections are located in a former part of the basic pattern transmission line section, and the first combined transmission line sections are located in a latter part of it.

7. The optical transmission system according to claim 1, wherein the plurality of optical repeaters include a first optical repeater supplying a plurality sets of pump light with first wavelengths to corresponding combined transmission line section and a second optical repeater supplying a plurality sets of pump light with second wavelengths to corresponding combined transmission line section.

8. The optical transmission system according to claim 7, wherein the plurality sets of pump light used by each of the first and second optical repeaters are located at equal wavelength interval or equal frequency interval.

9. The optical transmission system according to claim 7, further comprising at least one gain equalizer on the transmission line.

10. The optical transmission system according to claim 7, wherein when a pump light source fails in a certain optical repeater out of the plurality of optical repeaters, optical power of pump light with the same wavelength as the pump light generated by the failed pump light source is increased in another optical repeater.

11. The optical transmission system according claim 1, wherein each of the optical repeaters supplies a plurality sets of pump light with different wavelengths to corresponding combined transmission line section.

12. The optical transmission system according claim 1, further comprising means for depolarizing the pump light in the optical repeater.

13. The optical transmission system according claim 1, wherein the signal light is multi-wavelength light, and
wherein length of the combined transmission line section, accumulated wavelength dispersion of the combined transmission line section, and transfer rate of signals are determined in such a way that a delay amount between two signals transmitted by two pieces of light with adjacent wavelengths in the multi-wavelength light is 1/n bit for each combined transmission line section (n is an integer of 2 or more).

14. An optical transmission system in which optical repeaters are provided on a transmission line for transmitting signal light, comprising:
a plurality of combined transmission line sections, each on which is composed of a first optical fiber and a second optical fiber with a smaller mode field diameter than the first optical fiber that is located after the first optical fiber; and
a plurality of optical repeaters, each of which is provided between an adjacent pair of the combined transmission line sections and each of which inputs pump light to an output end of the second optical fiber of a preceding combined transmission line section in the backward direction so as to obtain Raman gain in the second optical fiber, wherein
the plurality of combined transmission line sections include a first combined transmission line section with positive accumulated wavelength dispersion and a second combined transmission line section with negative accumulated wavelength dispersion, and wherein
the transmission line is constituted by repeating a basic pattern transmission line section, each of which is composed of one or more first combined transmission line sections and one or more second combined transmission line sections, and an accumulated wavelength dispersion of each of said basic pattern transmission line is substantially zero.

15. An optical transmission system, comprising:
combined transmission line sections, each having a first optical fiber with positive-dispersion transmitting signal light into a second optical fiber with negative-dispersion, including a first combined transmission line section with positive accumulated wavelength dispersion and a second combined transmission line section with negative accumulated wavelength dispersion, wherein one or more first combined transmission line sections and one or more second combined transmission line sections form a basic pattern having an accumulated wavelength dispersion of substantially zero, the basic pattern being repeated; and optical repeaters, each provided between adjacent combined transmission line sections each optical repeater inputting pump light to an output end of the second optical fiber of one of the adjacent combined transmission line sections in the backward direction so as to obtain Raman gain in the second optical fiber.

16. An optical transmission system, comprising:
combined transmission line sections, each having a first optical fiber transmitting signal light into a second optical fiber with a smaller mode field diameter than the first optical fiber, including a first combined transmission line section with positive accumulated wavelength dispersion and a second combined transmission line section with negative accumulated wavelength dispersion wherein one or more first combined transmission line sections and one or more second combined transmission line sections form a basic pattern having an accumulated wavelength dispersion of substantially zero, the basic pattern being repeated; and optical repeaters, each provided between adjacent combined transmission line sections each optical repeater inputting pump light to an output end of the second optical fiber of one of the adjacent combined transmission line section in the backward direction so as to obtain Raman gain in the second optical fiber.

* * * * *

UNITED STATES PATENT AND TRADEMARK OFFICE
CERTIFICATE OF CORRECTION

| | | |
|---|---|---|
| PATENT NO. | : 7,209,654 B2 | Page 1 of 1 |
| APPLICATION NO. | : 09/962116 | |
| DATED | : April 24, 2007 | |
| INVENTOR(S) | : Toshiki Tanaka et al. | |

It is certified that error appears in the above-identified patent and that said Letters Patent is hereby corrected as shown below:

Column 22, Line 12, after "sections" insert --,--.

Column 22, Line 31, after "sections" insert --,--.

Signed and Sealed this

Seventh Day of August, 2007

JON W. DUDAS
*Director of the United States Patent and Trademark Office*